United States Patent
Atmur et al.

(10) Patent No.: US 9,768,664 B2
(45) Date of Patent: Sep. 19, 2017

(54) BALANCED ECCENTRIC GEAR DESIGN AND METHOD

(71) Applicant: The Boeing Company, Chicago, IL (US)

(72) Inventors: Robert J. Atmur, Whittier, CA (US); William Patrick Sargent, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 14/719,257

(22) Filed: May 21, 2015

(65) Prior Publication Data

US 2016/0344255 A1 Nov. 24, 2016

(51) Int. Cl.
| | |
|---|---|
| *H02K 7/06* | (2006.01) |
| *H02K 7/116* | (2006.01) |
| *F16H 1/32* | (2006.01) |
| *H02K 41/06* | (2006.01) |

(52) U.S. Cl.
CPC .............. *H02K 7/116* (2013.01); *F16H 1/321* (2013.01); *H02K 7/1163* (2013.01); *H02K 41/065* (2013.01)

(58) Field of Classification Search
CPC ....... H02K 41/065; H02K 7/116; H02K 41/06
USPC .................... 310/82–83, 49.47, 99
See application file for complete search history.

(56) References Cited

U.S. PATENT DOCUMENTS

| | | | |
|---|---|---|---|
| 37,165 | A | 12/1862 | Gary |
| 1,611,981 | A | 12/1926 | Amberg |
| 2,275,827 | A | 3/1942 | Plensler |
| 2,458,983 | A | 1/1949 | Dunn |

(Continued)

FOREIGN PATENT DOCUMENTS

| | | |
|---|---|---|
| CH | 233459 A | 7/1944 |
| CN | 2276093 Y | 3/1998 |

(Continued)

OTHER PUBLICATIONS

Machine Design, Sometimes it Pays to be Eccentric, May 18, 2000, retrieved from the internet on Feb. 18, 2015 from http://machinedesign.com/archive/sometimes-it-pays-be-eccentric, 7 pages.

(Continued)

*Primary Examiner* — Thanh Lam
(74) *Attorney, Agent, or Firm* — Kolisch Hartwell, P.C.

(57) ABSTRACT

A wobble plate drive system may include a stator having a central axis, an upper surface perpendicular to the central axis, and a plurality of stator teeth disposed on the upper surface. The system may further include a wobble plate having a wobble axis disposed at a non-zero angle relative to the central axis, a lower wobble surface perpendicular to the wobble axis, and an upper wobble surface perpendicular to the wobble axis. A plurality of lower wobble teeth may be disposed on the lower wobble surface and a plurality of upper wobble teeth may be disposed on the upper wobble surface. The system may include an output gear having an output axis substantially aligned with the central axis and a lower surface perpendicular to the output axis. A plurality of output teeth may be disposed on the lower surface. The wobble plate may be configured to rotate as it nutates around the stator.

20 Claims, 18 Drawing Sheets

(56) References Cited

U.S. PATENT DOCUMENTS

| | | | |
|---|---|---|---|
| 2,509,391 | A | 5/1950 | Hansen et al. |
| 2,699,690 | A | 1/1955 | Kobler |
| 2,703,370 | A | 3/1955 | Steensen |
| 2,857,536 | A | 10/1958 | Light |
| 2,866,110 | A | 12/1958 | Schön |
| 2,871,382 | A | 1/1959 | Bouvier |
| 3,117,244 | A | 1/1964 | Rosain et al. |
| 3,234,393 | A | 2/1966 | Ruschmann |
| 3,249,776 | A | 5/1966 | Anderson et al. |
| 3,322,984 | A | 5/1967 | Anderson |
| 3,341,726 | A | 9/1967 | Brinster et al. |
| 3,428,839 | A | 2/1969 | Singleton et al. |
| 3,463,953 | A | 8/1969 | Maxwell |
| 3,474,272 | A * | 10/1969 | Newell ............... H02K 41/065 310/180 |
| 3,525,890 | A * | 8/1970 | Buchanan, Jr. ......... F16H 1/321 310/82 |
| 3,539,847 | A | 11/1970 | Gifford |
| 3,579,276 | A * | 5/1971 | Newell ............... H02K 41/065 310/82 |
| 3,640,154 | A | 2/1972 | Massie |
| RE29,411 | E | 9/1977 | Newell |
| 4,081,702 | A | 3/1978 | Neumann |
| 4,330,725 | A * | 5/1982 | Hintz ..................... F16D 3/223 310/82 |
| 4,495,432 | A | 1/1985 | Katsuma et al. |
| 4,906,881 | A | 3/1990 | Knight |
| 5,111,102 | A | 5/1992 | Meeks |
| 5,747,915 | A | 5/1998 | Benavides |
| 5,804,898 | A * | 9/1998 | Kawai ................. H02K 41/065 310/268 |
| 5,820,504 | A | 10/1998 | Geralde |
| 5,906,142 | A | 5/1999 | Shirasawa |
| 6,568,929 | B2 | 5/2003 | Takagi |
| 6,664,711 | B2 * | 12/2003 | Baudendistel ......... H02N 2/105 310/323.02 |
| 7,165,473 | B2 | 1/2007 | Kobayashi et al. |
| 7,540,865 | B2 | 6/2009 | Griffin et al. |
| 7,824,345 | B2 | 11/2010 | Euteneuer et al. |
| 7,841,994 | B2 | 11/2010 | Skujins et al. |
| 7,850,623 | B2 | 12/2010 | Griffin et al. |
| 7,878,984 | B2 | 2/2011 | Jacobsen et al. |
| 7,914,466 | B2 | 3/2011 | Davis et al. |
| 7,914,467 | B2 | 3/2011 | Layman et al. |
| 7,969,055 | B2 | 6/2011 | Titus |
| 8,022,331 | B2 | 9/2011 | Reynolds et al. |
| 8,048,004 | B2 | 11/2011 | Davis et al. |
| 8,048,060 | B2 | 11/2011 | Griffin et al. |
| 8,105,246 | B2 | 1/2012 | Voeller et al. |
| 8,137,293 | B2 | 3/2012 | Zhou et al. |
| 8,169,118 | B2 | 5/2012 | Filatov |
| 8,182,465 | B2 | 5/2012 | Griffin et al. |
| 8,231,551 | B2 | 7/2012 | Griffin et al. |
| 8,257,279 | B2 | 9/2012 | Davis et al. |
| 8,368,269 | B2 | 2/2013 | Titus |
| 8,376,961 | B2 | 2/2013 | Layman et al. |
| 8,377,035 | B2 | 2/2013 | Zhou et al. |
| 8,409,114 | B2 | 4/2013 | Parins |
| 8,449,526 | B2 | 5/2013 | Snyder et al. |
| 8,535,243 | B2 | 9/2013 | Shireman |
| 8,551,020 | B2 | 10/2013 | Chen et al. |
| 8,551,021 | B2 | 10/2013 | Voeller et al. |
| 8,556,914 | B2 | 10/2013 | Vrba |
| 8,636,716 | B2 | 1/2014 | Griffin et al. |
| 8,646,360 | B2 | 2/2014 | Kanai |
| 9,124,150 | B2 | 9/2015 | Atmur |
| 9,164,497 | B2 | 10/2015 | Cameron et al. |
| 2010/0224435 | A1 | 9/2010 | Yamamori |
| 2014/0285072 | A1 | 9/2014 | Atmur et al. |
| 2015/0015174 | A1 | 1/2015 | Atmur |

FOREIGN PATENT DOCUMENTS

| | | | |
|---|---|---|---|
| CN | 203098755 | U | 7/2013 |
| CN | 104065202 | A | 9/2014 |
| DE | 10028964 | A1 | 1/2002 |
| DE | 10237686 | A1 | 2/2004 |
| DE | 102009002587 | A1 | 10/2010 |
| DE | 10237686 | B4 | 4/2013 |
| EP | 0565746 | A1 | 10/1993 |
| EP | 2169263 | A1 | 3/2010 |
| EP | 2169263 | B1 | 10/2011 |
| EP | 2782230 | A2 | 9/2014 |
| EP | 2838186 | A2 | 2/2015 |
| EP | 2933531 | A1 | 10/2015 |
| GB | 2211900 | A | 7/1989 |
| GB | 2327998 | A | 2/1999 |
| JP | 2014187867 | A | 10/2014 |
| JP | 2015039286 | A | 2/2015 |
| WO | 2008149696 | A1 | 12/2008 |
| WO | 2014051131 | A1 | 4/2014 |

OTHER PUBLICATIONS

Machine Design, Flexible gears minimize gearhead backlash for life, Jun. 7, 2001, retrieved from the internet on Feb. 18, 2015 from http://machinedesign.com/archive/flexible-gears-minimize-gearhead-backlash-life, 4 pages.

Machine Design, Flatter reducer makes waves, Jan. 24, 2002, retrieved from the internet on Feb. 18, 2015 from http://machinedesign.com/archive/flatter-reducer-makes-waves, 4 pages.

Susman, Zeke, Harmonic Drive, EVE5320 Mechatronics, Department of Electrical and Computer Engineering, Utah State University, Mar. 11, 2010, retrieved from the internet on Feb. 18, 2015 from http://mechatronics.ece.usu.edu/ece5320/Schedule/hw01-2010/hw1_Zeke_Susman_a.ppt, 27 pages.

Lipton, Tom, Wabble Drive Proof of Principle, Oct. 19, 2012, retrieved from the internet on Feb. 19, 2015 from http://oxtool.blogspot.com/2012/10/wabble-drive-proof-of-principle.html, 8 pages.

Harmonic Drive Systems, Inc., Strengths of HarmonicDrive®, retrieved from the internet on Feb. 18, 2015 from http://www.hds.co.jp/english/company/business/strength/, 5 pages.

Antonio S de Castro; Exploring a rehnomic system; Dec. 23, 1999, retrieved from the internet at https://arxiv.org/pdf/physics/9912049.pdf, 6 pages.

Carl A. Nelson et al., Similarity and Equivalence of Nutating Mechanisms to Bevel Epicyclic Gear Trains for Modeling and Analysis, Journal of Mechanical Design, Mar. 2005, vol. 127, 9 pages.

M. Elmoznino et al., An electro-mechanical Pericyclic CVT (P-CVT), 12th IFToMM World Congress, Besancon, France, Jun. 18-21, 2007, 6 pages.

Francesco Fasso et al., An elemental overview of the nonholonomic Noether theorem, Oct. 18, 2009, 11 pages.

Francesco Fasso et al., Conservation of energy and momenta in nonholonomic systems with affine constraints, May 5, 2015, 16 pages.

European Patent Office, Extended European Search Report in European Patent Application No. 16196546.2-1762, which is a foreign non-counterpart application to this U.S. application, dated May 3, 2017, 9 pages.

European Patent Office, Extended European Search Report in European Patent Application No. 16194812.0-1762, which is a foreign non-counterpart application to this U.S. application, dated Jun. 7, 2017, 8 pages.

\* cited by examiner

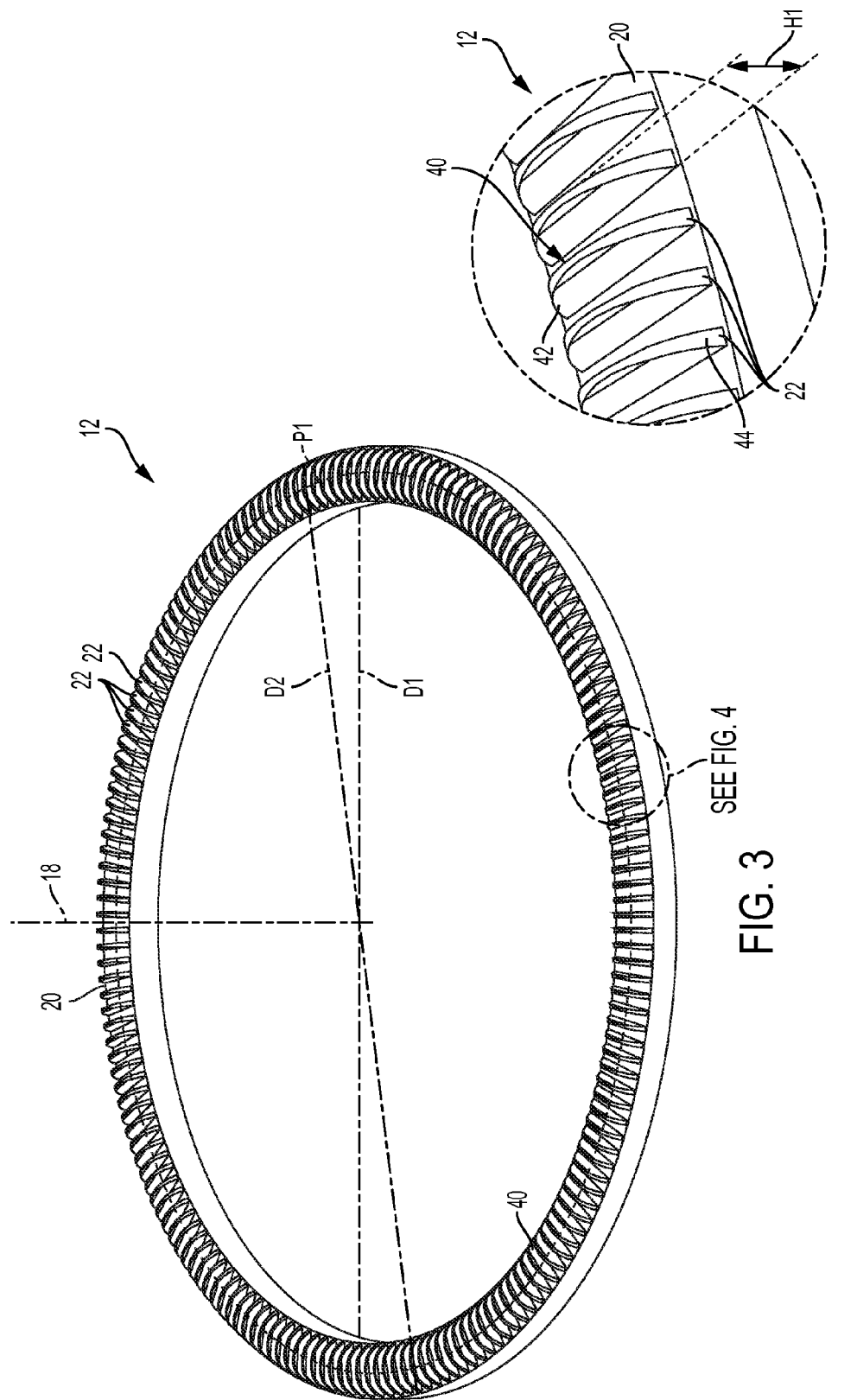

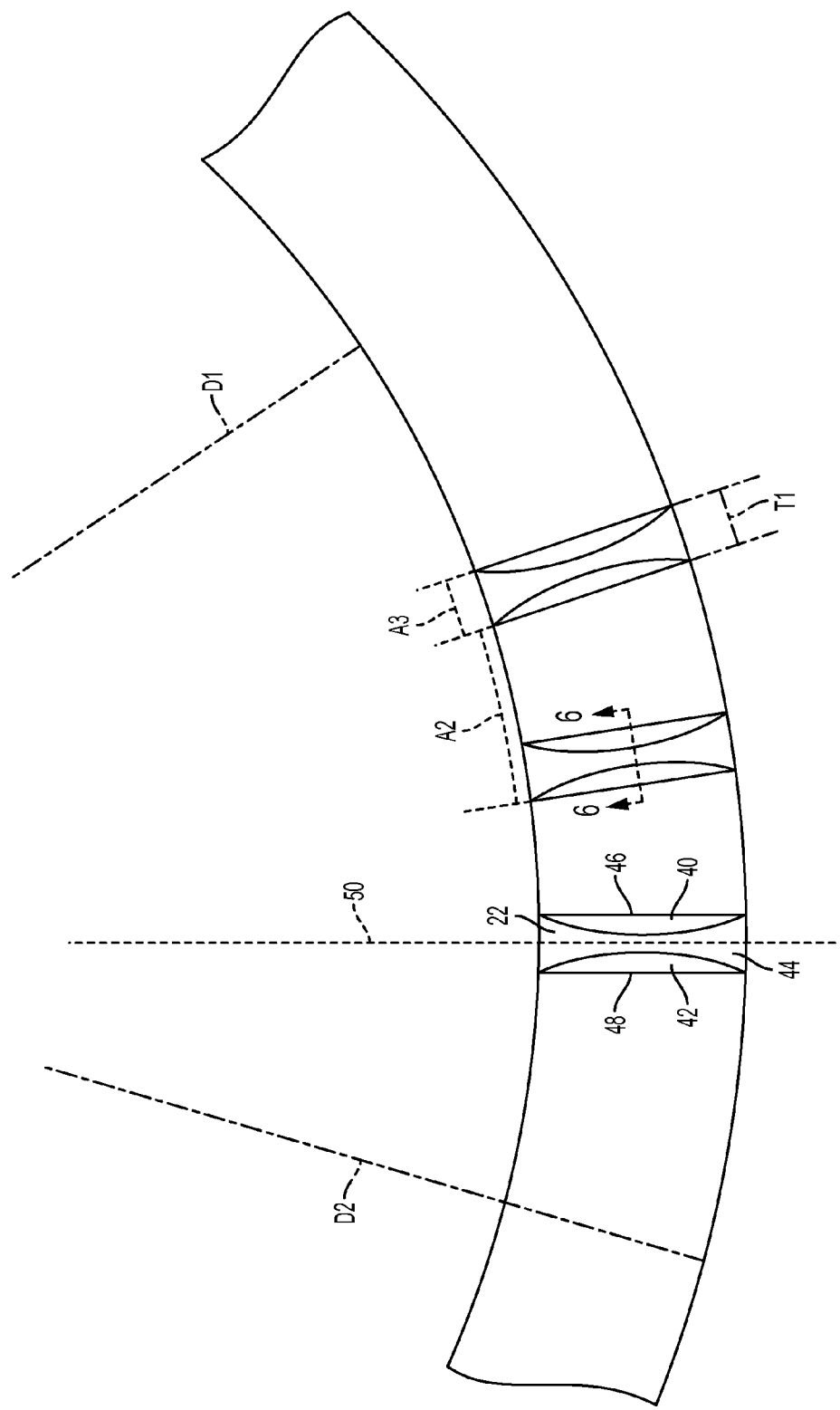

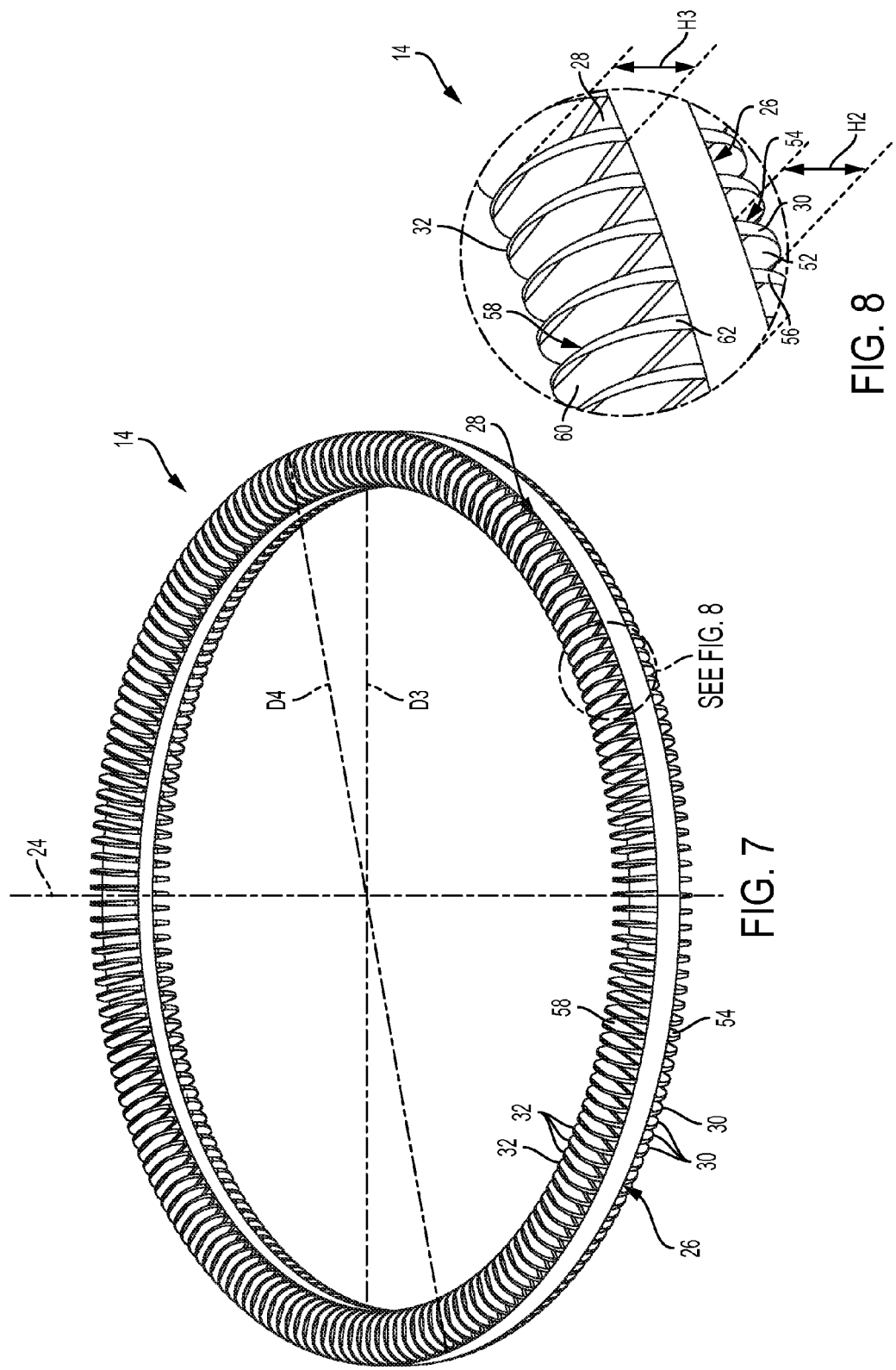

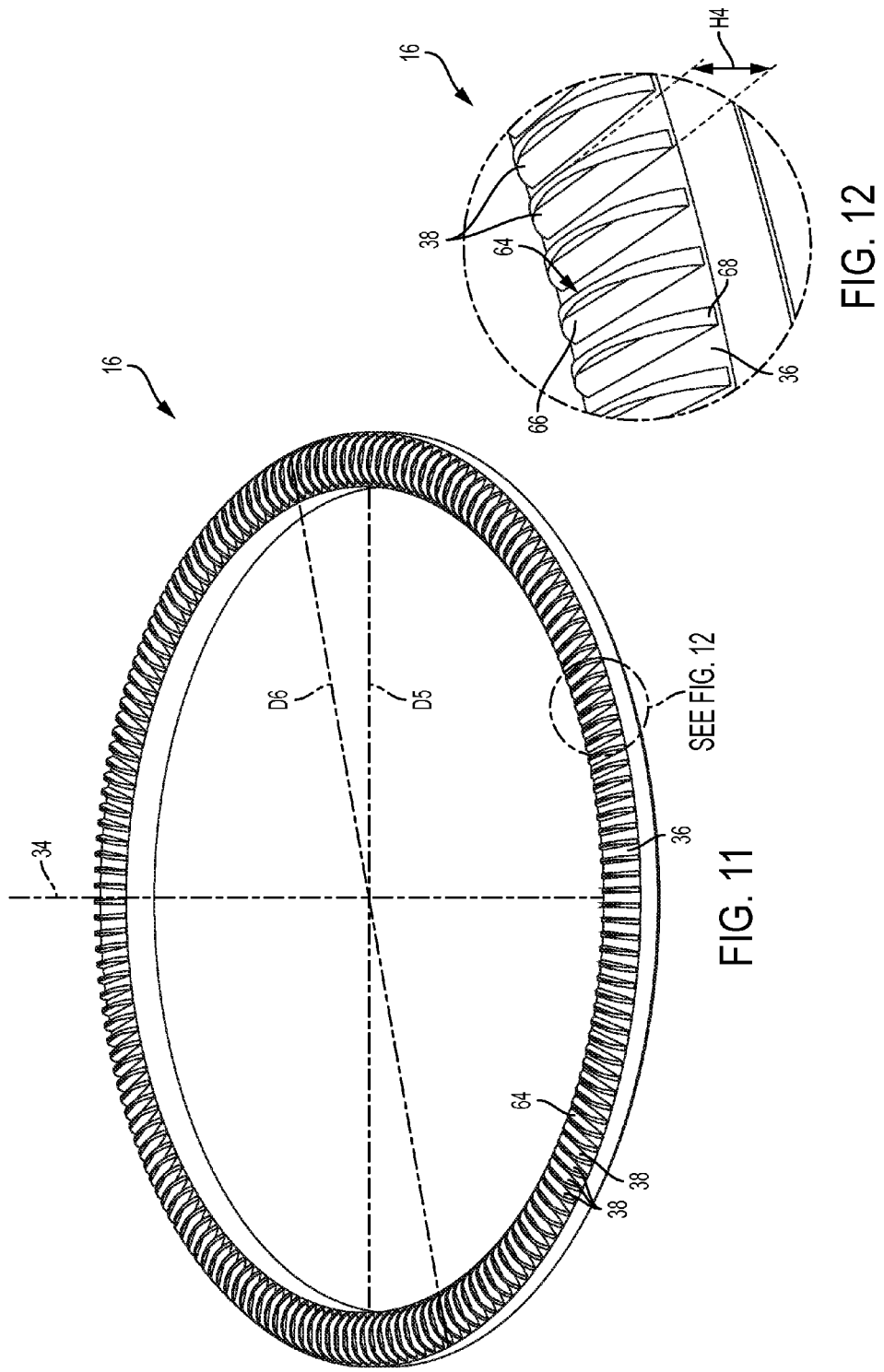

BALANCED ECCENTRIC GEAR DESIGN AND METHOD

FIELD

This disclosure relates generally to electric motors. More particularly, embodiments of the present disclosure relate to a wobble plate gear interface.

BACKGROUND

Electric motors create mechanical energy from electromagnetic energy. An alternating current (AC) motor generally includes a rotor and a stationary stator. The stationary stator usually has windings of electrical wires which carry an alternating current which produces a rotating magnetic field. Some rotors are made of ferromagnetic materials which respond to the rotating magnetic field generated by the stator, and as the magnetic field of the stator rotates the rotor will physically rotate. By coupling the rotor to an output shaft the electromagnetic energy of the AC current is converted to the rotational mechanical energy of the output shaft.

Two or more gears can be used to create a mechanical advantage through a gear ratio. There are many ways to arrange gears so that a single rotation of a first gear will result in more or less than one rotation of a second gear in the same amount of time. The gear ratio is the ratio of these two rotations. In the case where the second gear rotates less than the first gear the gear combination could be said to provide a gear reduction. In certain applications it is desirable to have an AC motor with a very high gear ratio, where the gear reduction takes place in the smallest possible volume. For example, an actuator that converts many oscillations of the electrical current into a single rotation of the output shaft could have very fine control.

Historically, wobble plate drive mechanisms have seemed a promising route towards a motor having a high gear ratio within a small volume. Examples of such wobble plate drive mechanisms are disclosed in U.S. Patent Publication Nos. US20140285072 and US20150015174. Older systems are disclosed in U.S. Pat. Nos. 2,275,827 and 3,249,776. The disclosures of these and all other publications referenced herein are incorporated by reference in their entirety for all purposes.

In a wobble plate mechanism, one of the gears, for example a rotor gear, nutates around the other gear, for example a stator gear. If the number of gear teeth on the rotor gear and the stator gear are different by one, then such a system would have a gear ratio equal to the number of teeth on the stator gear.

In principle, the gear ratios in wobble plate drive mechanisms could be quite high. A theoretical wobble plate drive mechanism only using two gears may achieve a very high ratio, in a small volume. However, in practice, efficient and effective wobble plate drive systems have proved elusive, because the forces involved often lead to disengagement of the mechanism or unacceptable levels of vibrations.

SUMMARY

An improved wobble plate drive system is disclosed, in various embodiments. These wobble plate drive systems may include a stator having a central axis, an upper surface perpendicular to the central axis, and a plurality of stator teeth disposed on the upper surface. The system may further include a wobble plate having a wobble axis disposed at a non-zero angle relative to the central axis, a lower wobble surface perpendicular to the wobble axis, and an upper wobble surface perpendicular to the wobble axis.

A plurality of lower wobble teeth may be disposed on the lower wobble surface and a plurality of upper wobble teeth may be disposed on the upper wobble surface. The system may include an output gear having an output axis substantially aligned with the central axis and a lower surface perpendicular to the output axis. A plurality of output teeth may be disposed on the lower surface. The wobble plate may be configured to rotate as it nutates around the stator.

A method for operating a wobble plate drive mechanism may include nutating a rotor about a fulcrum. The rotor may include a plurality of lower rotor teeth and a plurality of upper rotor teeth. The method may further include impelling a first side of the rotor to press against a stationary stator at a first location. The stator may include a plurality of stator teeth. The method may further include impelling a second side of the rotor to press against an output plate at a second location. The second location may be on an opposite side of the rotor as the first location and the output plate may include a plurality of output teeth. The method may include engaging the lower rotor teeth with the stator teeth and the upper rotor teeth with the output teeth as the rotor nutates about the fulcrum.

A gear for use with a nutating wobble plate may include a central axis, an surface perpendicular to the central axis, an inner diameter, and an outer diameter. A set of teeth may be disposed on the surface between the inner diameter and the outer diameter. At least one of the set of teeth may have a first driving face extending from the inner diameter to the outer diameter. The first driving face may be defined by a compound involute of a circle and an ellipse. At least one of the set of teeth may be disposed on the surface between the inner diameter and the outer diameter.

The present disclosure provides various apparatuses and methods of use thereof. In some embodiments, a device may include a stator, a wobble plate/rotor, and an output plate/output gear. In some embodiments, the wobble plate/rotor may nutate around the stator and the output plate/output gear as the output plate/output gear rotates. In some embodiments, each of the stator, the wobble plate/rotor and the output plate/output gear may include a set of teeth having shapes designed to limit eccentric forces. Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 3 is a diagrammatic representation of an isometric view of a stator gear of the drive system of FIG. 1, showing a plurality of stator teeth.

FIG. 4 is a diagrammatic representation of a detailed view of FIG. 3, showing several stator teeth of the stator gear of FIG. 4.

FIG. 5 is a diagrammatic representation of a top plan view of the stator gear of FIG. 4, showing a subset of stator teeth.

FIG. 7 is a diagrammatic representation of an isometric view of a wobble plate of the drive system of FIG. 1, showing a plurality of lower wobble teeth and a plurality of upper wobble teeth.

FIG. 8 is a diagrammatic representation of a detailed view of FIG. 7, showing several upper wobble teeth and lower wobble teeth of the wobble plate of FIG. 7.

FIG. 11 is a diagrammatic representation of an isometric view of an output gear of the drive system of FIG. 1, showing a plurality of output teeth, the output gear being in an inverted position as compared to FIG. 1.

FIG. 12 is a diagrammatic representation of a detailed view of FIG. 11, showing several output teeth.

DESCRIPTION

Various embodiments of apparatuses and methods relating to a wobble plate gear interface are described below and illustrated in the associated drawings. Unless otherwise specified, an apparatus or method and/or their various components or steps may, but are not required to, contain at least one of the structures, components, functionality, and/or variations described, illustrated, and/or incorporated herein. Furthermore, the structures, components, functionalities, and/or variations described, illustrated, and/or incorporated herein in connection with the apparatuses and methods may, but are not required to, be included in other similar apparatuses or methods. The following description of various embodiments is merely exemplary in nature and is in no way intended to limit the disclosure, its application or uses. Additionally, the advantages provided by the embodiments, as described below, are illustrative in nature and not all embodiments provide the same advantages or the same degree of advantages.

Figure 1:
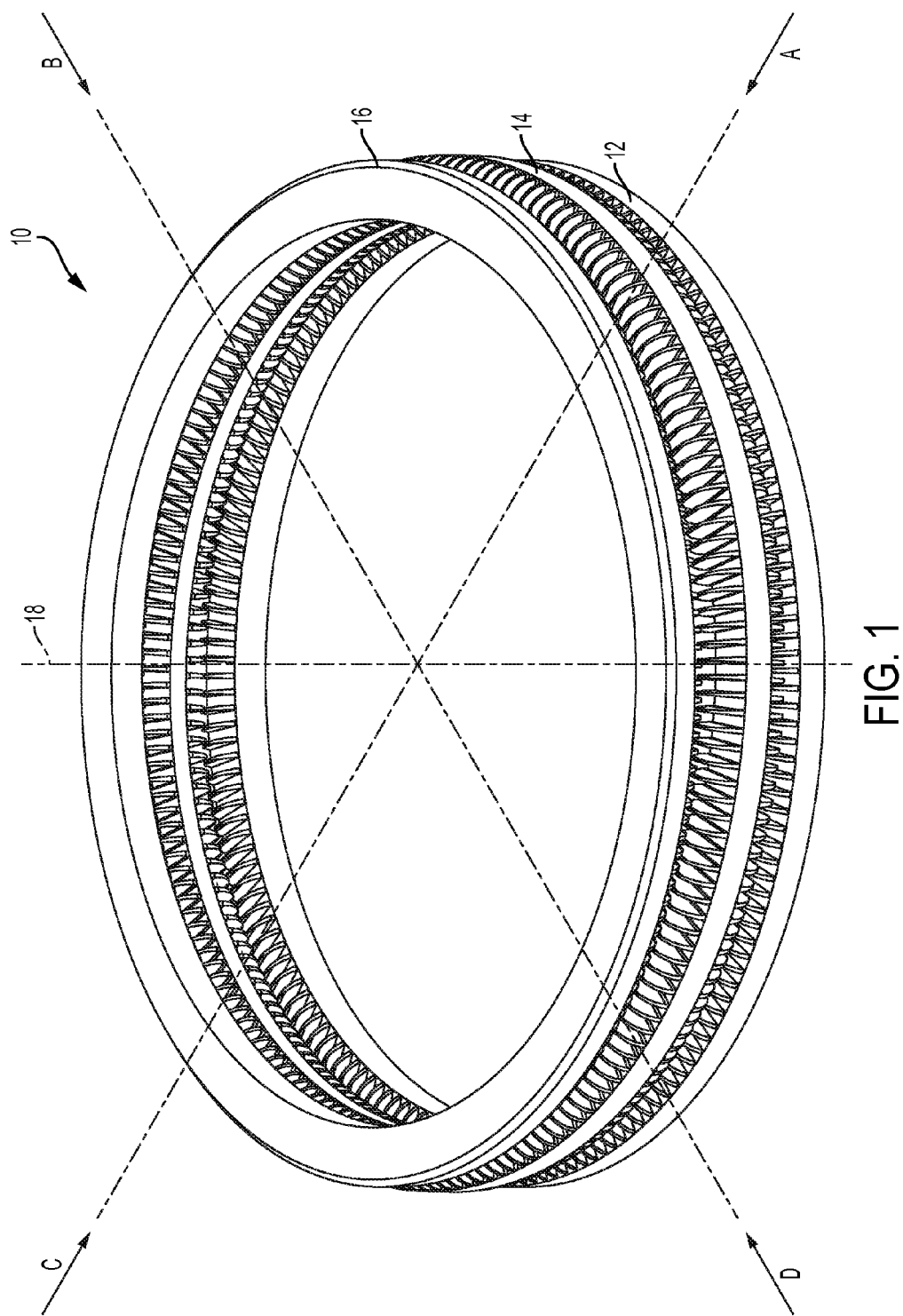
FIG. 1 is a diagrammatic representation of an isometric view of an embodiment of a wobble plate drive system.
Figure 2:
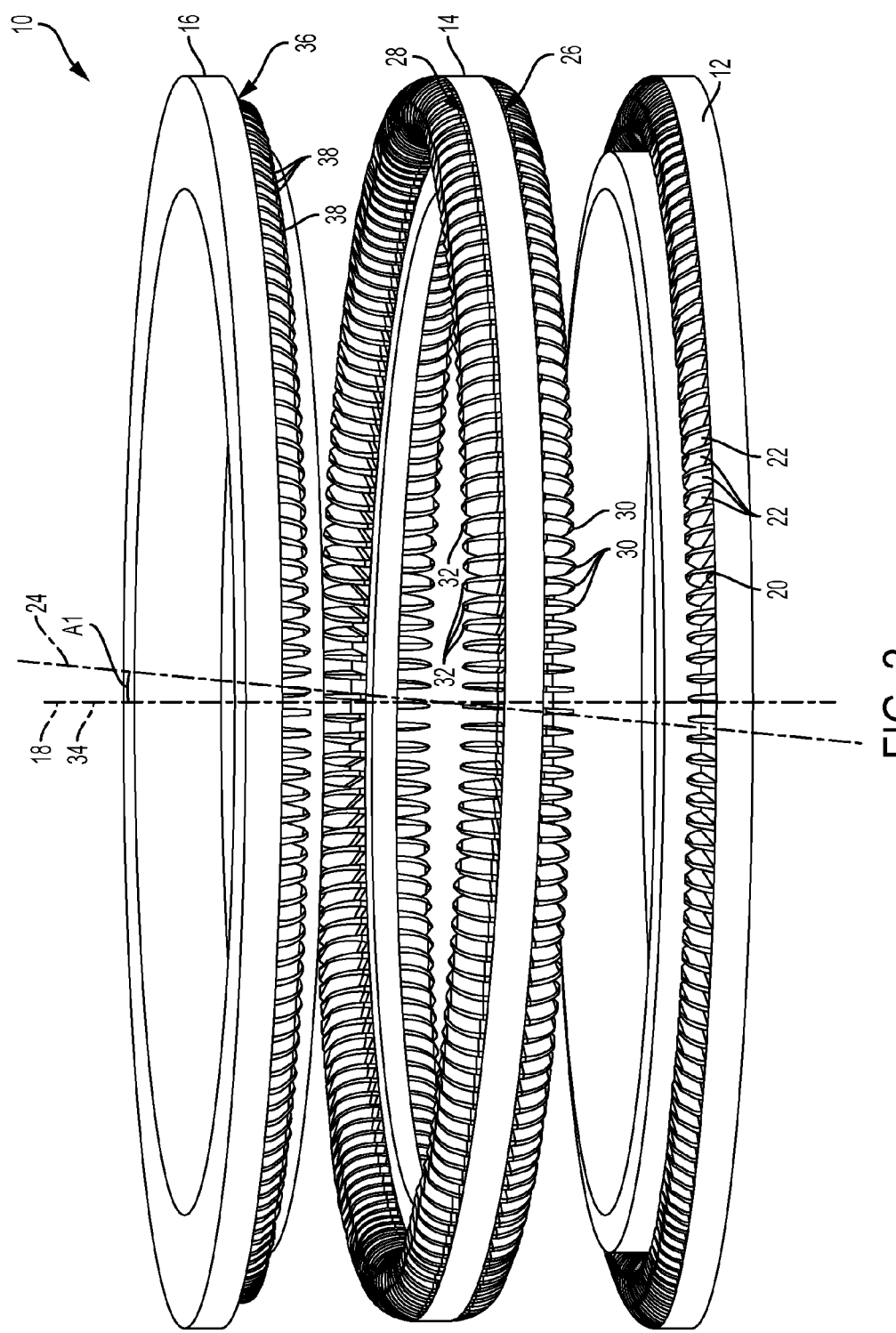
FIG. 2 is a diagrammatic representation of an isometric exploded view of the drive system of FIG. 1.

FIG. 1 is an isometric view of an exemplary embodiment of a wobble plate drive system, generally indicated at 10. FIG. 2 is an exploded isometric view of wobble plate drive system 10. Wobble plate drive system 10 may include a stator or stator gear 12, a wobble plate or wobble gear or rotor 14, and an output plate or output gear 16. With reference to FIG. 2, the stator may have a central axis 18, an upper surface 20 substantially perpendicular to the central axis, and a plurality of stator teeth 22 disposed on the upper surface.

Wobble plate 14 may have a wobble axis 24 disposed at a non-zero wobble angle A1 relative to the central axis. Wobble plate 14 may have a lower wobble surface 26 substantially perpendicular to the wobble axis and an upper wobble surface 28 substantially perpendicular to the wobble axis and opposite to the lower wobble surface. A plurality of lower wobble teeth 30 may be disposed on the lower wobble surface and a plurality of upper wobble teeth 32 may be disposed on the upper wobble surface.

Output gear 16 may have an output axis 34 substantially aligned with the central axis 18 and a lower surface 36 substantially perpendicular to the output axis. A plurality of output teeth 38 may be disposed on lower surface 36.

Wobble plate 14 may be configured to nutate around stator 12. That is, the wobble axis 24 may precess around the central axis 18 of the stator in a manner so that angle A1 between the two axes is relatively constant. As the wobble plate nutates, a first location of the lowest point on the lower wobble surface 26 may move in a circle around the stator and a second location of the highest point on the upper wobble surface 28 may move in a circle around the output gear. The wobble plate may be configured to rotate as it nutates around the stator.

FIG. 3 is an isometric view of stator 12. Stator 12 may have an inner diameter D1 and an outer diameter D2. Stator 12 may be an annulus as depicted in FIG. 3 or it may be a solid disk. Between the central axis 18 and the inner diameter D1, stator 12 may have any suitable structure. Stator 12 may have a pitch circle P1 disposed in between the inner and outer diameters. Pitch circle P1 may be halfway between the inner and outer diameters.

The plurality of stator teeth 22 may be disposed on upper surface 20 in between inner diameter D1 and outer diameter D2. A count of the plurality of stator teeth may be any appropriate number. In the exemplary embodiment depicted in FIG. 3 there are 180 stator teeth. Stator 12 may be stationary within the context of whatever device is using wobble plate drive system 10.

FIG. 4 is a detailed view of stator 12, showing several stator teeth 22 disposed on upper surface 20. Each stator tooth 22 may include a first driving face 40, see also FIG. 3. The first driving face 40 may extend from inner diameter D1 to outer diameter D2. First driving face 40 may be planar, composed of more than one plane, or may be composed of one or more surfaces with curvature.

On the opposite side of a stator tooth 22 from the first driving face may be a second driving face 42. The second driving face 42 may extend from the inner diameter D1 to the outer diameter D2. Second driving face 42 may be planar, composed of more than one planes, or may be composed of one or more surfaces with curvature.

Each stator tooth 22 may have an upper stator tooth surface 44 extending from the first driving face 40 to the second driving face 42. The upper stator tooth surface 44 may define a tooth height H1 as the distance between the upper stator tooth surface 44 and the upper surface 20 of the stator 12 as measured along a direction parallel to the central axis 18, see also FIG. 6A.

The tooth height H1 may have a maximum value between the inner diameter D1 and the outer diameter D2. The tooth height may have a maximum value at the pitch circle P1. The tooth height H1 may have a minimum value at one of the inner or the outer diameter D1 or D2. The tooth height may be zero at one or both of the inner and the outer diameter D1 and D2. There are many possible ways in which the tooth height H1 may vary between the inner and outer diameters, while still having the maximum value in between the inner and outer diameters and the minimum value at either of the inner or outer diameter. In the exemplary embodiment shown in FIG. 4 upper stator tooth surface 44 is defined by a semicircle. Other shapes that could define upper stator tooth surface 44 include, but are not limited to, an ellipse, a triangle, a parabola, or any other appropriate curve, combination of curves, combination of straight lines, or combination of curves and straight lines.

FIG. 5 is a top plan view of stator 12, showing a subset of stator teeth 22. Each stator tooth may make a substantially rectangular footprint on upper surface 20. That is, a first line 46 made by the junction of the first driving face 40 with the upper surface 20 may be parallel to a second line 48 made by the junction of the second driving face 42 with the upper surface 20. Both the first and second lines 46 and 48 may be parallel to radial line 50 extending from the central axis 18 (see FIG. 3). Each stator tooth may have a thickness T1, a linear distance measured between the first and second driving faces 40 and 42. The thickness T1 of each stator tooth 22 may have substantially the same value at the inner and outer diameters D1 and D2.

A pair of adjacent stator teeth may define a tooth pitch A2 as an angular separation between corresponding locations on each tooth 22 of the pair of adjacent stator teeth. For example, the tooth pitch A2 may be the angular separation measured from where the second line 48 intersects the inner diameter D1 on a tooth 22 to that same intersection on an adjacent tooth. Each tooth footprint may have an angular width A3, given by the thickness T1, divided by one half of the inner diameter D1. The angular width A3 of a tooth footprint may be less than one half of the tooth pitch A2.

Figure 6B:
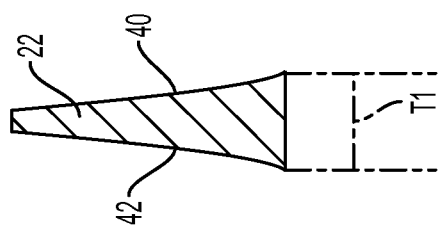
FIG. 6B is a diagrammatic representation of a cross-sectional view of a single stator tooth, taken along plane 6-6 in FIG. 5, the horizontal and vertical scales being the same.
Figure 6A:
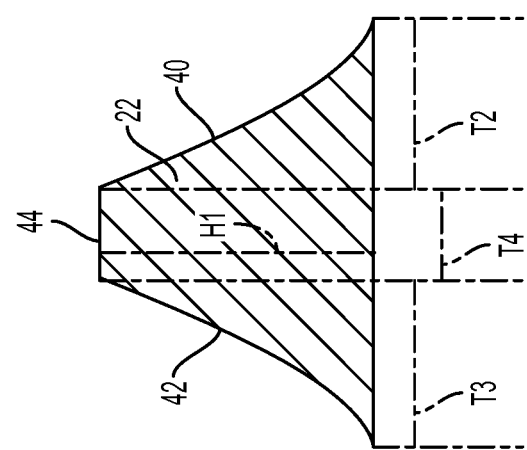
FIG. 6A is a diagrammatic representation of a cross-sectional view of a single stator tooth, taken along plane 6-6 in FIG. 5, the horizontal scale being exaggerated to show curvature.

FIGS. 6A and 6B are cross-sectional views, taken along plane 6-6 in FIG. 5, of an exemplary single stator tooth 22. The horizontal scale in FIG. 6A is exaggerated in order to show the curvature of the sides of the tooth, while the horizontal and vertical scales in FIG. 6B are substantially the same.

In the exemplary embodiment shown in FIGS. 6A and 6B, the first and second driving faces 40 and 42 may be defined by a compound involute of a circle and an ellipse. That is, the curve of second driving face 42 shown in FIG. 6A may be defined by the equation: $y=A(\sin(\theta)-\theta\cos(\theta))^D$, where A is a constant which may be proportional to a radius of the pitch circle P1 and the wobble angle A1, θ may take values from 0 to $$\frac{\pi}{2}$$

radians, and D may be a positive constant less than 1. D may have a value of 0.65. The curve of first driving face 40 may be a mirror image of the curve of second driving face 42, reflected across a plane that is vertical in the view of FIG. 6A and perpendicular to the plane of FIG. 6A.

The tooth thickness T1, see FIG. 5, may be divided into three segments of a first face thickness T2, a second face thickness T3, and an upper stator tooth surface thickness T4. The first face thickness T2 may be the linear width of the portion of the footprint underneath the first driving face 40. The second face thickness T3 may be the linear width of the portion of the footprint underneath the second driving face 42. Thicknesses T2 and T3 may be the same. The upper stator tooth surface thickness T4 may be the linear width of the portion of the footprint underneath the upper stator tooth surface 44.

FIG. 7 is an isometric view of wobble plate or rotor 14. Wobble plate 14 may be an annulus as depicted in FIG. 7 or it may be a solid disk. Wobble plate 14 may have any suitable structure interior to the pluralities of upper and lower wobble teeth 32 and 30. Wobble plate 14 may be operably coupled to a fulcrum (not shown) proximate the wobble axis 24 (see FIG. 2). The fulcrum may be stationary within the context of whatever device houses wobble plate drive system 10. Wobble plate 14 may be configured to nutate around stator 12 (see FIG. 2).

The upper and lower wobble teeth (32 and 30) may be disposed on the upper and lower wobble surface (28 and 26) between an inner wobble diameter D3 and an outer wobble diameter D4. A count of the lower wobble teeth 30 may be any appropriate number. In the exemplary embodiment shown in FIG. 7 there are 181 lower wobble teeth 30. The count of lower wobble teeth 30 may be one more or one less than the count of stator teeth 22 (see FIG. 2). The count of lower wobble teeth 30 may be different than the count of stator teeth 22 (see FIG. 2) by any number, including one and zero.

A count of the upper wobble teeth 32 may be any appropriate number. In the exemplary embodiment shown in FIG. 7 there are 182 upper wobble teeth 32. The count of upper wobble teeth 32 may be different than the count of lower wobble teeth 30 by any number, including zero, one, or more than one. There may be more or less upper wobble teeth 32 than lower wobble teeth 30.

FIG. 8 is a detailed view of wobble plate 14, showing several lower wobble teeth 30 disposed on lower wobble surface 26 and several upper wobble teeth 32 disposed on upper wobble surface 28. Each lower wobble tooth 30 may have a first driven face 52 extending from the inner wobble diameter D3 to the outer wobble diameter D4 (see FIG. 7). First driven face 52 may be planar, composed of more than one plane, or may be composed of one or more surfaces with curvature. The first driven face 52 may be configured to engage with the first driving face 40 of a stator tooth 22 (see FIG. 4) as the wobble plate 14 nutates around stator 12 (see FIG. 2) in a first nutation direction.

Each lower wobble tooth 30 may have a second driven face 54 opposite the first driven face 52. A second driven face 54 may be seen more clearly in FIG. 7. The second driven face 54 may extend from the inner wobble diameter D3 to the outer wobble diameter D4. Second driven face 54 may be planar, composed of more than one plane, or may be composed of one or more surfaces with curvature. The second driven face 54 may be configured to engage with the second driving face 42 of a stator tooth 22 (see FIG. 4) as the wobble plate 14 nutates in a second nutation direction.

Each lower wobble tooth 30 may have a lower wobble tooth surface 56 extending from the first driven face 52 to the second driven face 54. The lower wobble tooth surface 56 may define a tooth depth H2 as the distance between the lower wobble tooth surface 56 and the lower wobble surface 26 of the wobble plate 14 as measured along a direction parallel to the wobble axis 24 (see FIG. 2). Tooth depth H2 may also be seen in FIG. 10A.

Tooth depth H2 may have a maximum value, that is, farthest removed from lower wobble surface 26, between the inner and outer wobble diameters D3 and D4. Tooth depth H2 may have a minimum value, that is, closest to the lower wobble surface 26, at one of the inner or outer wobble diameters D3 or D4. The lower wobble tooth surface 56 may vary in any appropriate manner from the inner wobble diameter D3 to the outer wobble diameter D4, including but not limited to, along a path defined by a semicircle, an ellipse, a triangle, a parabola, or any other combinations of curves and straight lines.

Each upper wobble tooth 32 may have a third driving face 58 extending from the inner wobble diameter D3 to the outer wobble diameter D4. A third driving face 58 may be seen more clearly in FIG. 7. Third driving face 58 may be planar, composed of more than one plane, or may be composed of one or more surfaces with curvature.

Each upper wobble tooth 32 may include a fourth driving face 60 opposite the third driving face 58 extending from the inner wobble diameter D3 to the outer wobble diameter D4. Fourth driving face 60 may be planar, composed of more than one plane, or may be composed of one or more surfaces with curvature.

Each upper wobble tooth 32 may have an upper wobble tooth surface 62 extending from the third driving face 58 to the fourth driving face 60. The upper wobble tooth surface 62 may define a tooth height H3 as the distance between the upper wobble tooth surface 62 and the upper wobble surface 28 of the wobble plate 14 as measured along a direction parallel to the wobble axis 24 (see FIG. 2).

Tooth height H3 may have a maximum value between the inner and outer wobble diameters D3 and D4. Tooth height H3 may have a minimum value at one of the inner or outer wobble diameters D3 or D4. The upper wobble tooth surface 62 may vary in any appropriate manner from the inner wobble diameter D3 to the outer wobble diameter D4, including but not limited to, along a path defined by a semicircle, an ellipse, a triangle, a parabola, or any other combinations of curves and straight lines.

Figure 9:
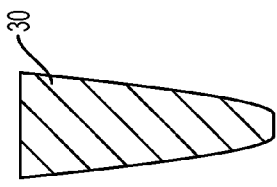
FIG. 9 is a diagrammatic representation of a top plan view of a single lower wobble tooth.

FIG. 9 is a top plan view of a single lower wobble tooth 30. Lower wobble tooth 30 may have a rectangular footprint on lower wobble surface 26 (see FIGS. 7 and 8) in the same manner that the stator teeth 22 may have rectangular footprints as described in reference to FIG. 5. A linear thickness T5 of lower wobble tooth 30 may have the same value at the inner wobble diameter D3 as at the outer wobble diameter D4 (see FIG. 7).

Figure 10B:
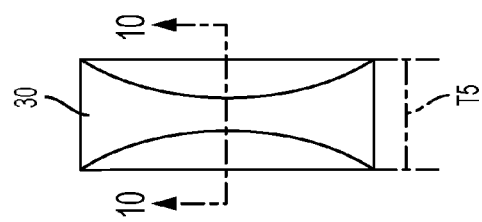
FIG. 10B is a diagrammatic representation of a cross-sectional view of a single lower wobble tooth, taken along plane 10-10 in FIG. 9, the horizontal and vertical scales being the same.
Figure 10A:
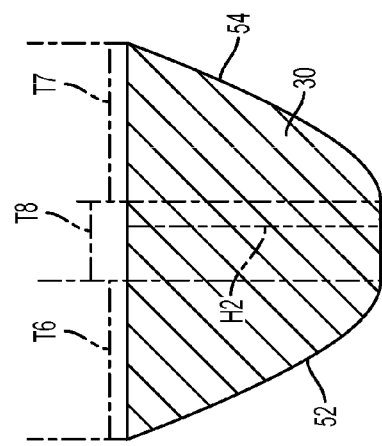
FIG. 10A is a diagrammatic representation of a cross-sectional view of a single lower wobble tooth, taken along plane 10-10 in FIG. 9, the horizontal scale being exaggerated to show curvature.

FIGS. 10A and 10B are cross-sectional views of an exemplary lower wobble tooth 30, taken at 10-10 in FIG. 9. As with FIGS. 6A and 6B, the horizontal scale of FIG. 10A has been exaggerated in order to show the curvature of the first and second driven faces 52 and 54.

In the exemplary embodiment shown in FIGS. 10A and 10B, the first and second driven faces 52 and 54 may be defined by a compound involute of a circle and an ellipse, as described in reference to FIGS. 6A and 6B. That is, the curve of first driven face 52 shown in FIG. 10A may match the curve of first driving face 40 in FIG. 6A. The first driven face 52 may be complementary to the first driving face 40. The first driven and driving faces 52 and 40 may be complementary regardless of the specific shape of the curve of the first driving face 40.

The curve of second driven face 54 shown in FIG. 10A may match the curve of second driving face 42 in FIG. 6A. That is, the second driven face 54 may be complementary to the second driving face 42. The second driven and driving faces 54 and 42 may be complementary regardless of the specific shape of the curve of the second driving face.

The thickness T5 of lower wobble tooth 30 (see FIG. 9) may be divided into three segments, including a first driven face thickness T6, a second driven face thickness T7, and a lower wobble tooth surface thickness T8. The first driven face thickness T6 may be the linear width of the portion of the footprint underneath the first driven face 52. The second driven face thickness T7 may be the linear width of the portion of the footprint underneath the second driven face 54. Thicknesses T6 and T7 may be the same. The lower wobble tooth surface thickness T8 may be the linear width of the portion of the footprint underneath the lower wobble tooth surface 56. The first driven face thickness T6 may be the same as the first face thickness T2, see FIG. 6A. The second driven face thickness T7 may be the same as the second face thickness T3, see FIG. 6A.

With reference again to FIGS. 7 and 8, the plurality of upper wobble teeth 32 may have substantially the same shape as the plurality of lower wobble teeth 30. That is, each of the upper wobble teeth 32 may have a rectangular footprint on the upper wobble surface 28, as depicted in FIG. 9 for a lower wobble tooth 30 on the lower wobble surface 26. The cross-sectional shape of an upper wobble tooth 32 may be a reflection of the cross-sectional shape of a lower wobble tooth 30 of FIGS. 10A and 10B across a plane defined by the wobble plate 14 itself. That is, the upper and lower wobble teeth 32 and 30 may have the same cross-section with the lower wobble teeth 30 extending downwards from the lower wobble surface 26 toward the stator 12 (see FIG. 2) and the upper wobble teeth 32 extending upwards from the upper wobble surface 28 towards the output gear 16 (see FIG. 2).

Each of the upper wobble teeth 32 may have at least one face defined by a compound involute of a circle and an ellipse as discussed in reference to FIGS. 6A and 6B. The third and fourth driving faces 58 and 60 of an upper wobble tooth 32 may be defined by a compound involute of a circle and an ellipse.

The thickness of the upper wobble teeth 32 may be different than the thickness of the lower wobble teeth 30 if there are different numbers of upper and lower wobble teeth 32 and 30. For example, if there are 181 lower wobble teeth 30 and 182 upper wobble teeth 32, then the upper wobble teeth 32 may be thinner than the lower wobble teeth 30 by a factor of 181/182.

FIG. 11 is an isometric view of output gear 16. For clarity, output gear 16 in FIG. 11 appears "upside down," relative to its orientation in FIGS. 1 and 2. Output gear 16 may have an inner output diameter D5 and an outer output diameter D6. Between the output axis 34 and the inner output diameter D5, output gear 16 may have any suitable structure.

The plurality of output teeth 38 may be disposed on the lower surface 36 between inner output diameter D5 and outer output diameter D6. A count of the plurality of output teeth may be any appropriate number. In the exemplary embodiment depicted in FIG. 11 there are 181 output teeth. Output gear 16 may be free to rotate around the output axis 34 within the context of whatever device is using wobble plate drive system 10. Output gear 16 may be coupled to an output shaft or an output arm.

FIG. 12 is a detailed view of output gear 16, showing several output teeth 38 disposed on lower surface 36. Each output tooth 38 may include a third driven face 64. A third driven face 64 may be seen more clearly in FIG. 11. The third driven face 64 may extend from inner output diameter D5 to outer output diameter D6. Third driven face 64 may be planar, composed of more than one plane, or may be composed of one or more surfaces with curvature. The third driven face 64 may be configured to engage with the third driving face 58 of an upper wobble tooth 32 as the wobble plate 14 (see FIGS. 7 and 8) nutates around the output gear 16 in the first nutation direction.

On the opposite side of an output tooth 38 from the third driven face 64 may be a fourth driven face 66. The fourth driven face 66 may extend from the inner output diameter D5 to the outer output diameter D6. Fourth driven face 66 may be planar, composed of more than one planes, or may be composed of one or more surfaces with curvature. The fourth driven face 66 may be configured to engage with the fourth driving face 60 (see FIG. 8) of an upper wobble tooth 32 as the wobble plate 14 (see FIGS. 7 and 8) nutates around the output gear 16 in the second nutation direction.

Each output tooth 38 may have a lower output tooth surface 68 extending from the third driven face 64 to the fourth driven face 66. The lower output tooth surface 68 may define an output tooth depth H4 as the distance between the lower output tooth surface 68 and the lower surface 36 as measured along a direction parallel to the output axis 34 (see FIG. 11).

Output tooth depth H4 may have a maximum value, that is, the lower output tooth surface 68 may be farther from lower surface 36, between the inner and outer output diameters D5 and D6. Output depth H4 may have a minimum value, that is, the lower output tooth surface 68 may be closest to the lower surface 36, at one of the inner or outer output diameters D5 or D6. The lower output tooth surface 68 may vary in any appropriate manner from the inner output diameter D5 to the outer output diameter D6, including but not limited to, along a path defined by a semicircle, an ellipse, a triangle, a parabola, or any other combinations of curves and straight lines.

Figure 13:
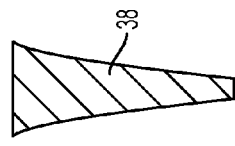
FIG. 13 is a diagrammatic representation of a bottom plan view of a single output tooth.

FIG. 13 is a bottom plan view of a single output tooth 38. Output tooth 38 may have a rectangular footprint on lower surface 36 (see FIGS. 11 and 12) in the same manner that the stator teeth 22 may have rectangular footprints as described in reference to FIG. 5. A linear thickness T9 of output tooth 38 may have the same value at the inner output diameter D5 as at the outer output diameter D6 (see FIG. 11).

Figure 14B:
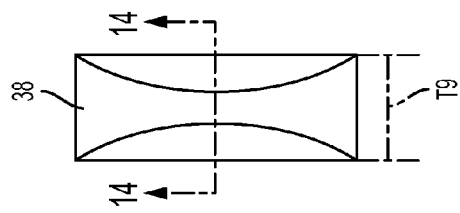
FIG. 14B is a diagrammatic representation of a cross-sectional view of a single stator tooth, taken along plane 14-14 in FIG. 13, the horizontal and vertical scales being the same.
Figure 14A:
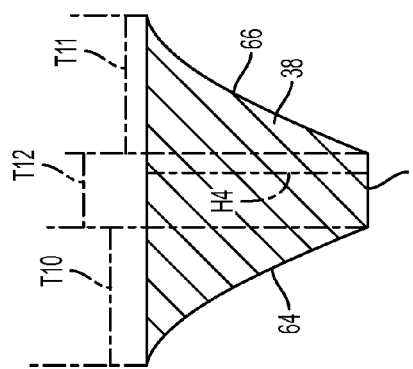
FIG. 14A is a diagrammatic representation of a cross-sectional view of a single output tooth, taken along plane 14-14 in FIG. 13, the horizontal scale being exaggerated to show curvature.

FIGS. 14A and 14B are cross-sectional views of an exemplary output tooth 38, taken at 14-14 in FIG. 13 and pointing downward as the output teeth 38 appear in FIGS. 1 and 2. As with FIGS. 6A and 6B, the horizontal scale of FIG. 14A has been exaggerated in order to show the curvature of the third and fourth driven faces 64 and 66.

In the exemplary embodiment shown in FIGS. 14A and 14B, the third and fourth driven faces 64 and 66 may be defined by a compound involute of a circle and an ellipse, as described in reference to FIGS. 6A and 6B. That is, the curve of third driven face 64 shown in FIG. 14A may match the curve of the third driving face 58 (see FIGS. 7 and 8). The third driven face 64 may be complementary to the third driving face 58. The third driven and driving faces 64 and 58 may be complementary regardless of the specific shape of the curve of the third driving face 58.

The curve of fourth driven face 66 shown in FIG. 14A may match the curve of the fourth driving face 60 (see FIG. 8). That is, the fourth driven face 66 may be complementary to the fourth driving face 60. The fourth driven and driving faces 66 and 60 may be complementary regardless of the specific shape of the curve of the fourth driving face 60.

The thickness T9 (see FIG. 13) of output tooth 38 may be divided into three segments, including a third driven face thickness T10, a fourth driven face thickness T11, and a lower output tooth surface thickness T12. The third driven face thickness T10 may be the linear width of the portion of the footprint underneath the third driven face 64. The fourth driven face thickness T11 may be the linear width of the portion of the footprint underneath the fourth driven face 66. Thicknesses T10 and T11 may be the same. The lower output tooth surface thickness T12 may be the linear width of the portion of the footprint underneath the lower output tooth surface 68. The third driven face thickness T10 may be the same as a third driving face 58 (see FIGS. 7 and 8) thickness. The fourth driven face thickness T11 may be the same as a fourth driving face 60 (see FIG. 8) thickness.

Figure 15:
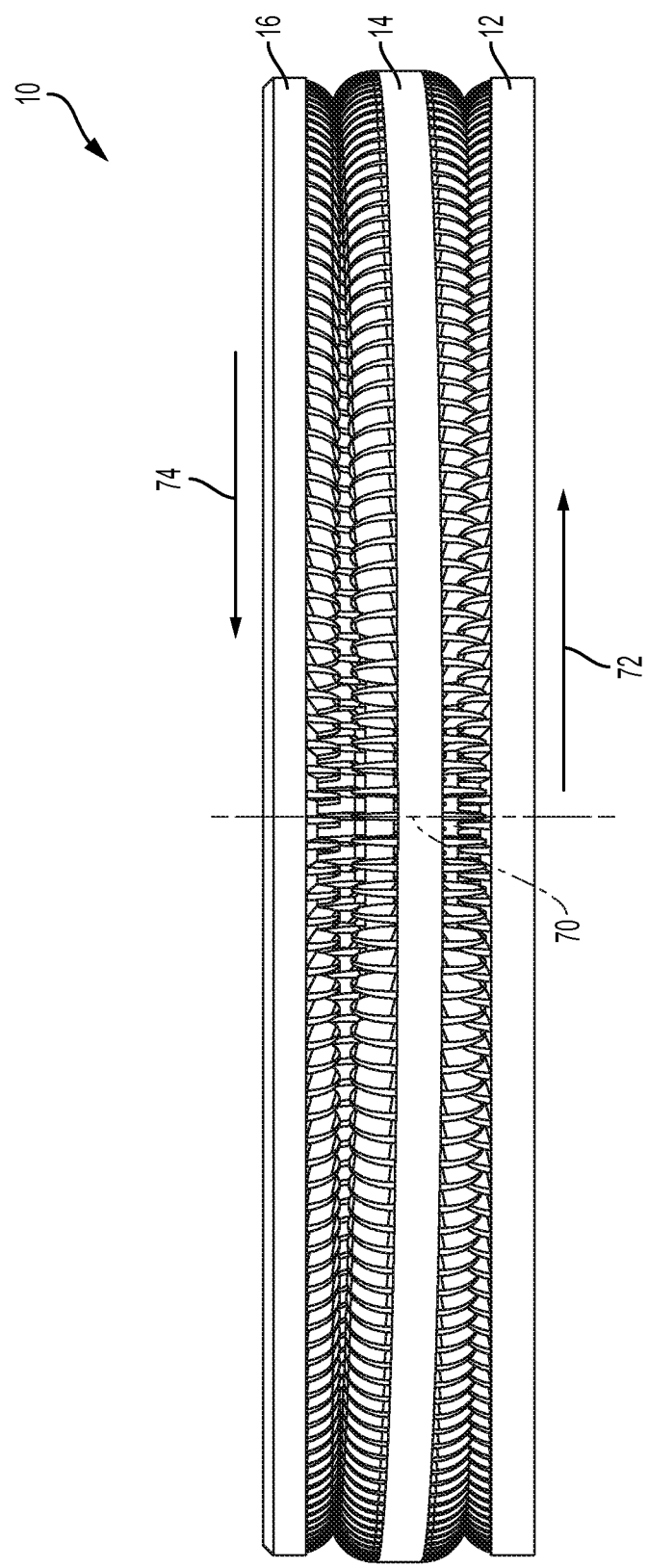
FIG. 15 is a diagrammatic representation of a side plan view of the drive system of FIG. 1, taken at A in FIG. 1, showing a down position of the wobble plate.

FIG. 15 is a side plan view of wobble plate drive system 10, taken at A in FIG. 1. Wobble plate 14 may have a down position 70 where the wobble plate 14 is closest to stator 12. Wobble plate drive system 10 may be configured so that wobble plate 14 nutates around the stator 12 and the output gear 16 in a first nutation direction indicated by arrow 72.

When wobble plate 14 nutates in the first nutation direction the down position 70 may move in direction 72, that is, to the right in FIG. 15. Wobble plate drive system 10 may be configured so that wobble plate 14 may nutate around the stator 12 and the output gear 16 in a second nutation direction indicated by arrow 74. When wobble plate 14 nutates in the second nutation direction, the down position 70 of wobble plate 14 may move in direction 74.

Figure 16:
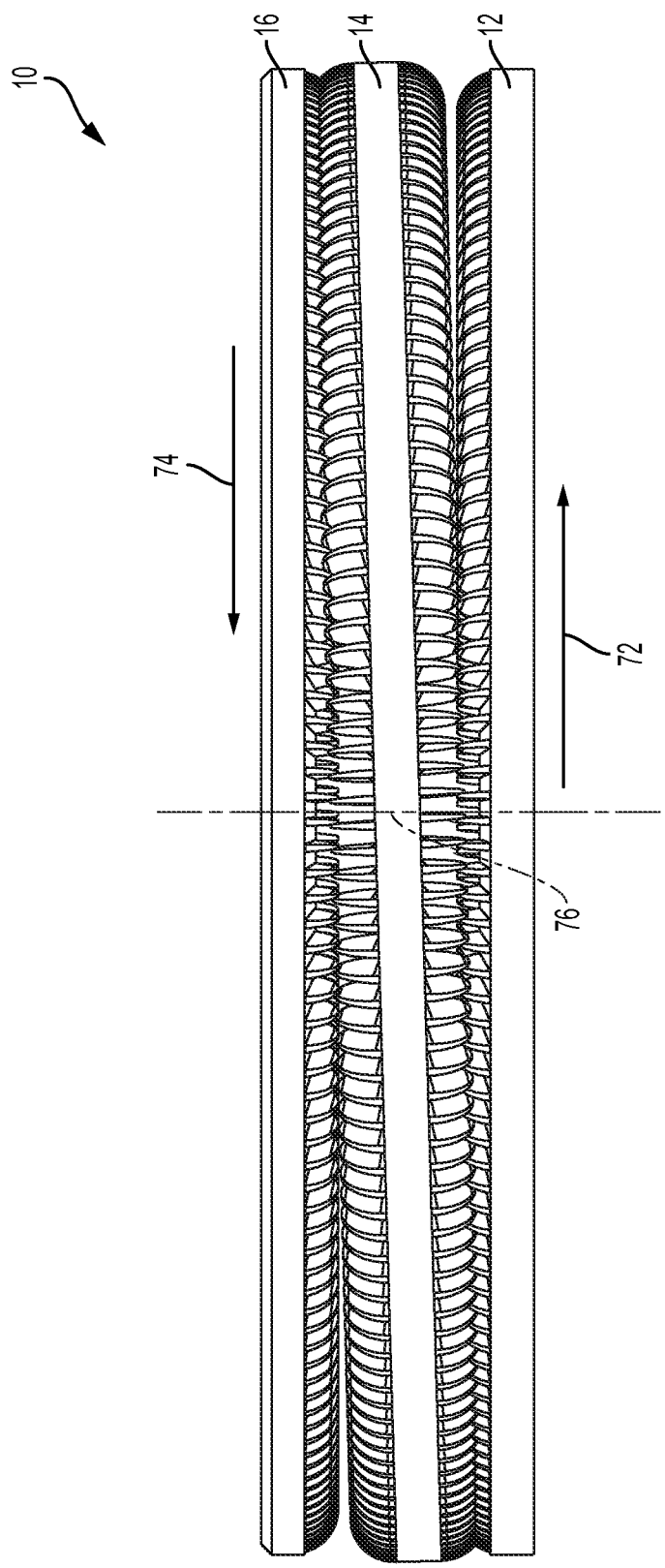
FIG. 16 is a diagrammatic representation of a side plan view of the drive system of FIG. 1, taken at B in FIG. 1, showing a 90-degree position which is one fourth of the way around the drive system from the down position.

FIG. 16 is a side plan view of wobble plate drive system 10, taken at B in FIG. 1. Wobble plate 14 may have a position 76 that is 90 degrees away from down position 70 (see FIG. 15) in the first nutation direction 72. That is, the 90-degree position 76 may be one fourth of the way around wobble plate 14 from the down position 70 in the direction indicated by arrow 72.

As the wobble plate 14 nutates in the first nutation direction, the 90-degree position 76 may move in direction 72. In between down position 70 (see FIG. 15) and the 90-degree position 76, a subset of the plurality of lower wobble teeth 30 may make contact with a subset of the plurality of stator teeth 22. This contact may be seen more clearly in FIGS. 19 and 20 described below. In between the down position 70 and the 90-degree position 76, there may be no upper wobble teeth 32 making contact with any output teeth 38, see FIGS. 19 and 20.

Figure 17:
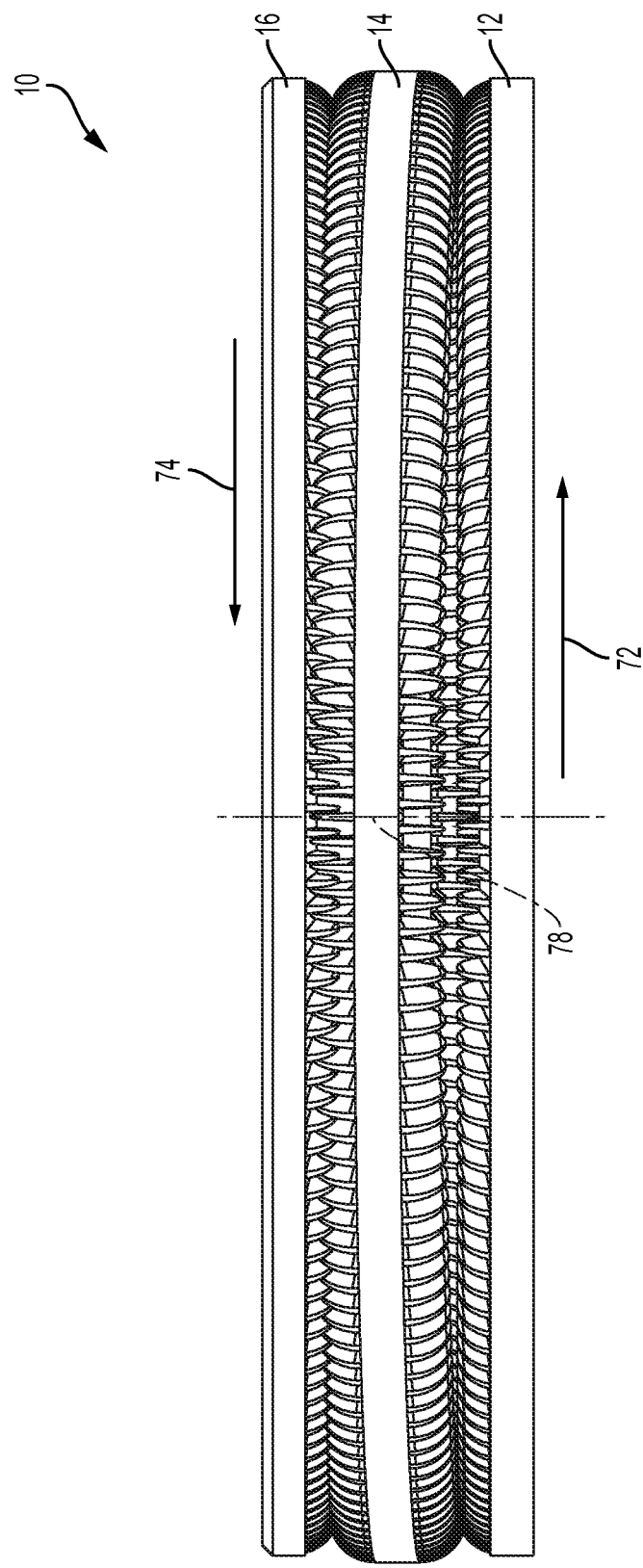
FIG. 17 is a diagrammatic representation of a side plan view of the drive system of FIG. 1, taken at C in FIG. 1, showing a 180-degree position which is one half of the way around the drive system from the down position.

FIG. 17 is a side plan view of wobble plate drive system 10, taken at C in FIG. 1. Wobble plate 14 may have a position 78 that is 180 degrees away from down position 70 (see FIG. 15) in the first nutation direction 72. That is, the 180-degree position 78 may be on the opposite side of wobble plate 14 from the down position 70.

As the wobble plate 14 nutates in the first nutation direction, the 180-degree position 78 may move in direction 72. In between the 90-degree position 76 (see FIG. 16) and the 180-degree position 78, a subset of the plurality of upper wobble teeth 32 may make contact with a subset of the plurality of output teeth 38. This contact may be seen more clearly in FIGS. 20 and 21 described below. In between the 90-degree position 76 and the 180-degree position 78 there may be substantially no contact between the plurality of lower wobble teeth 30 and the plurality of stator teeth 22, see FIGS. 20 and 21.

Figure 18:
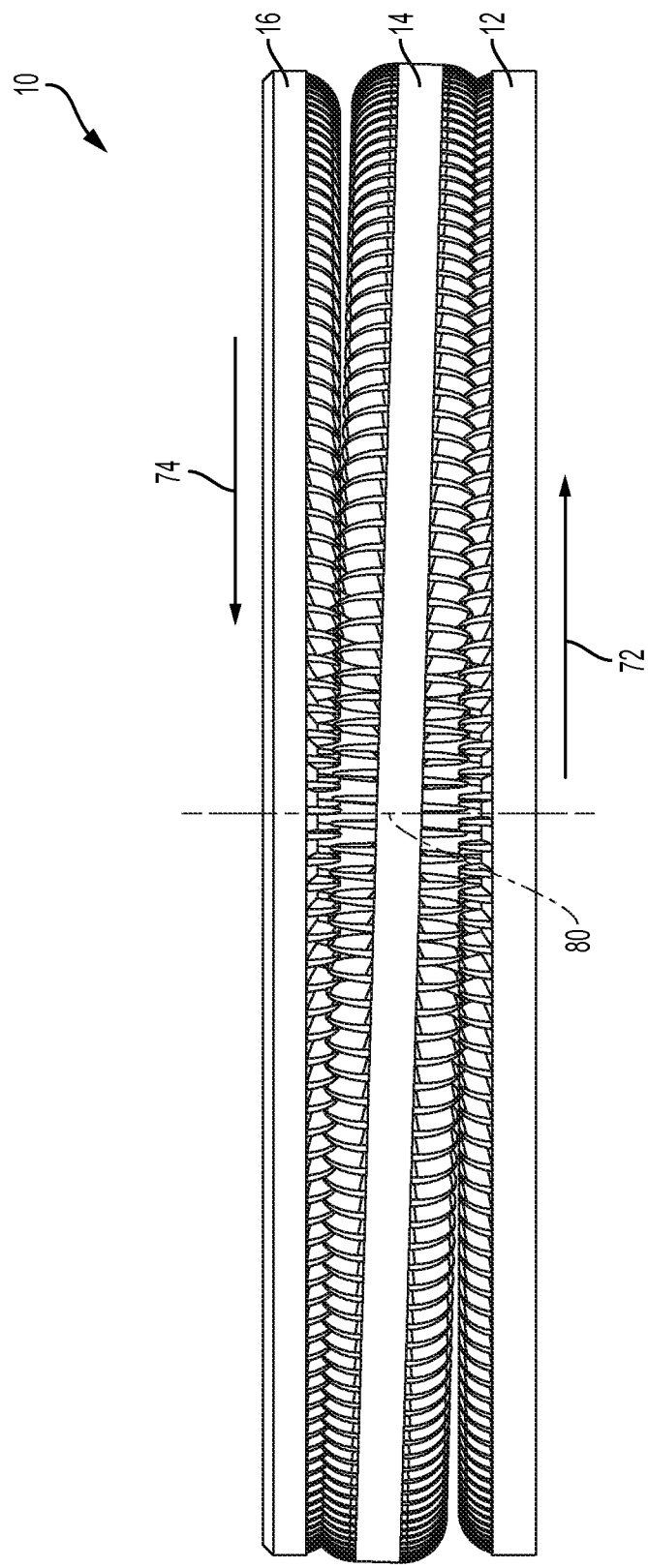
FIG. 18 is a diagrammatic representation of a side plan view of the drive system of FIG. 1, taken at D in FIG. 1, showing a 270-degree position which is three fourths of the way around the drive system from the down position.

FIG. 18 is a side plan view of wobble plate drive system 10, taken at D in FIG. 1. Wobble plate 14 may have a position 80 that is 270 degrees away from the down position 70 (see FIG. 15) in the first nutation direction 72. That is, the 270-degree position may be on the opposite side of wobble plate 14 from the 90-degree position 76 (see FIG. 16).

As the wobble plate 14 nutates in the first nutation direction, the 270-degree position 80 may move in direction 72. In between the 180-degree position 78 (see FIG. 17) and the 270-degree position 80, there may be substantially no contact between the lower wobble teeth 30 and the stator teeth 22 (see FIGS. 21 and 22). In between the 180-degree position 78 and the 270-degree position 80, there may be substantially no contact between the upper wobble teeth 32 and the output teeth 38 (see FIGS. 21 and 22).

Figure 22:
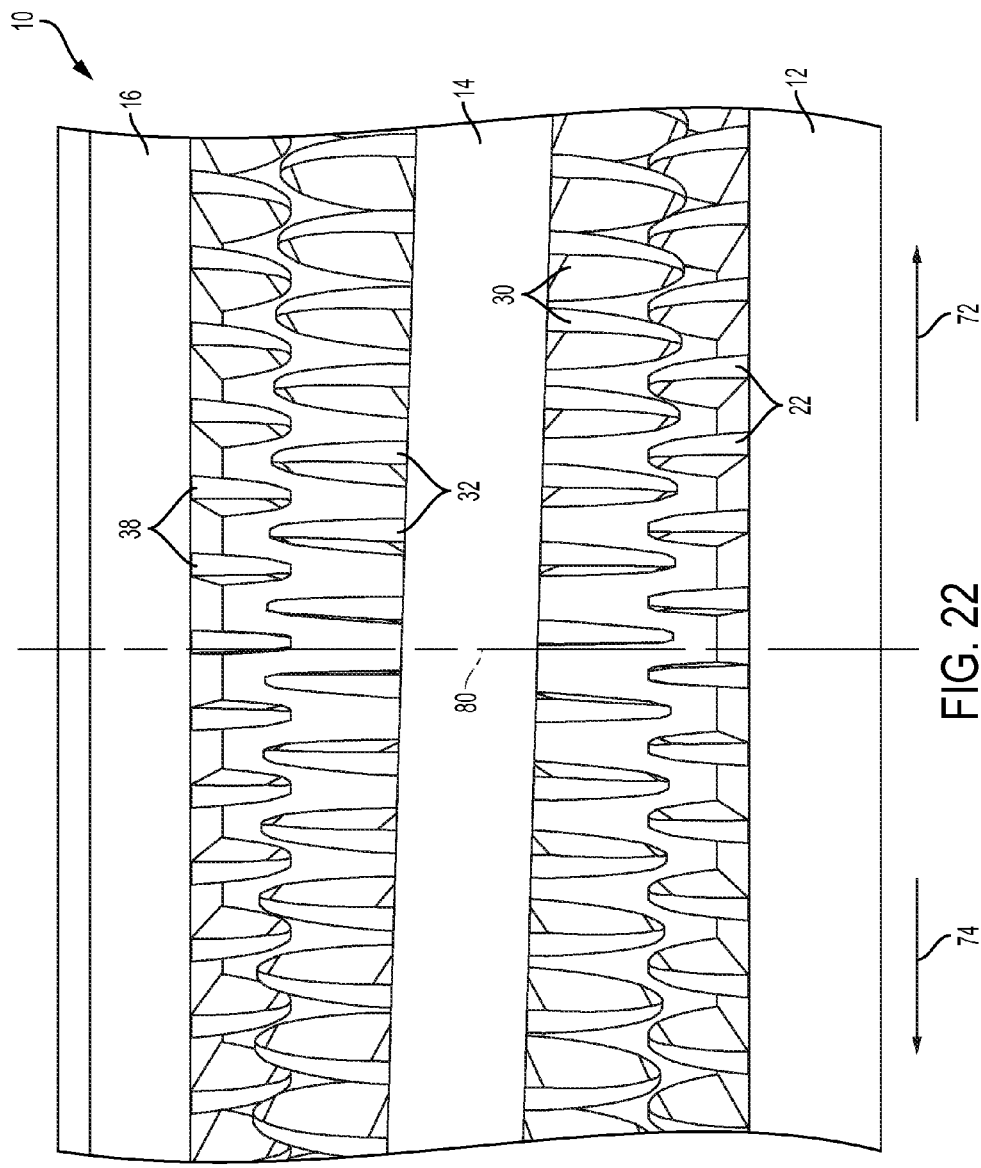
FIG. 22 is a diagrammatic representation of a zoomed in view of FIG. 18, showing the 270-degree position.

In between the 270-degree position 80 and the down position 70 (see FIG. 15), there may be substantially no contact between the lower wobble teeth 30 and the stator teeth 22 (see FIG. 22). In between the 270-degree position 80 and the down position 70, there may be substantially no contact between the upper wobble teeth 32 and the output teeth 38 (see FIG. 22).

Figure 19:
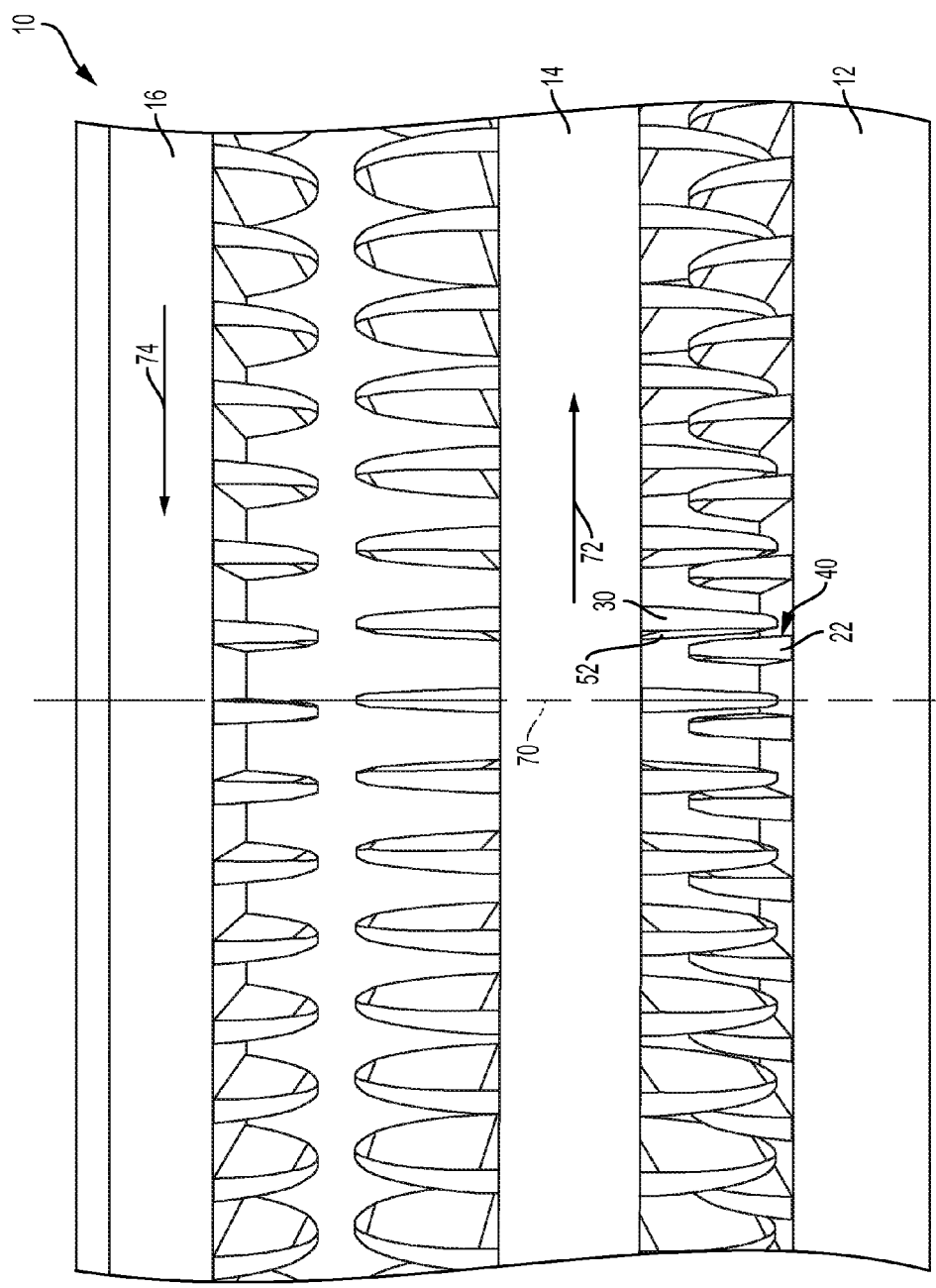
FIG. 19 is a diagrammatic representation of a zoomed in view of FIG. 15, showing the down position of the wobble plate.

FIG. 19 is a zoomed in view of FIG. 15, showing the down position 70 of the wobble plate 14. As described in reference to FIG. 16, a subset of stator teeth 22 may make contact, or engage with, a subset of lower wobble teeth 30 between the down position 70 and the 90-degree position 76 (see FIG. 19, where the 90-degree position 76 is in the direction 72 away from down position 70. The contact between a stator tooth 22 and a lower wobble tooth 30 may be between the first driving face 40 of stator tooth 22 and the first driven face 52 of lower wobble tooth 30.

Figure 20:
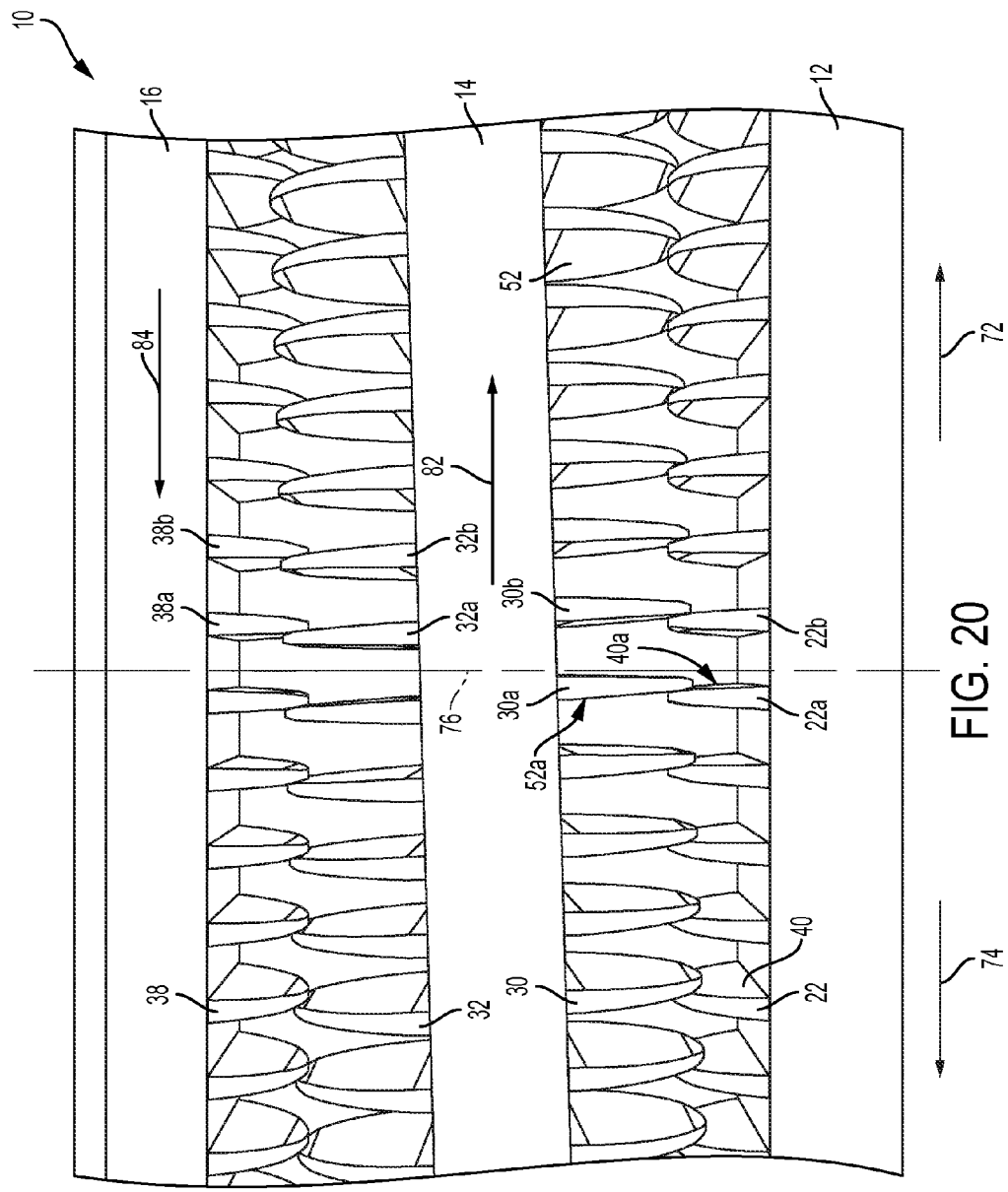
FIG. 20 is a diagrammatic representation of a zoomed in view of FIG. 16, showing the 90-degree position of the wobble plate, contact between the stator teeth and the lower wobble teeth, and contact between the upper wobble teeth and the output teeth.

FIG. 20 is a zoomed in view of FIG. 16, showing the 90-degree position 76 of the wobble plate 14. As the wobble plate nutates in the first nutation direction 72, a subset of the lower wobble teeth 30 may make contact with a subset of stator teeth 22 between the 90-degree position 76 and the down position 70 (see FIG. 19). For example, lower wobble tooth 30a in FIG. 20 may make contact with stator tooth 22a during a nutation of wobble plate 14. This contact may first occur when lower wobble tooth 30a is proximate the 90-degree position 76 and may cease when lower wobble tooth 30a is proximate the down position 70 (see FIG. 19). The first contact between lower wobble tooth 30a and stator tooth 22a may occur at any location between the 90-degree position 76 and the down position 70 (see FIG. 19) and may cease at any location between the down position 70 and the point of first contact.

As the wobble tooth nutates in direction 72, lower wobble tooth 30a may make sliding contact with stator tooth 22a. That is, the first driven face 52a of lower wobble tooth 30a may slide down the first driving face 40a of stator tooth 22a. As the wobble plate nutates in the first nutation direction 72, contact forces exerted on the first driven faces 52 of the plurality of lower wobble teeth 30 by the first driving faces 40 of the plurality of stator teeth 22 may point substantially along direction arrow 72. These forces may cause wobble plate 14 to rotate in direction 82 with respect to stator 12.

The first nutation direction 72 may be taken to be a direction tangent to the pitch circle P1 depicted in FIG. 3. Thus, the contact forces exerted on the first driven faces 52 of the plurality of lower wobble teeth 30 by the first driving faces 40 of the plurality of stator teeth 22 may point substantially parallel to a direction tangent to the pitch circle P1. The direction of the contact forces may be a consequence of the respective shapes of the lower wobble teeth 30 and the stator teeth 22.

If the contact forces instead pointed in a direction other than tangent to the pitch circle P1, then those non-tangent forces could cause eccentric motion in wobble plate drive system 10. For example, if the non-tangent contact forces pointed in a direction from the stator towards the wobble plate, such forces could cause disengagement between the lower wobble teeth 30 and the stator teeth 22. In another example, if the non-tangent contact forces pointed in a radial direction away or towards the central axis 18 (see FIG. 2), such forces could cause non-circular or eccentric motion of the rotor 14 which may lead to unwanted vibrations.

In the exemplary embodiment shown in FIG. 20, the stator 12 has 180 stator teeth, the wobble plate 14 has 181 lower wobble teeth 30 and 182 upper wobble teeth 32, and the output plate 16 has 181 output teeth. However, any appropriate numbers can be chosen for the numbers of the various pluralities of teeth.

During a nutation, lower wobble tooth 30a may make contact with stator tooth 22a, lower wobble tooth 30b may make contact with stator tooth 22b, etc. Further, upper wobble tooth 32a may make contact with output tooth 38a, upper wobble tooth 32b may make contact with output tooth 38b, etc. In the case where there is one more lower wobble teeth than stator teeth, on the next nutation, lower wobble tooth 30a may engage stator tooth 22b, etc. That is, after one nutation, lower wobble tooth 30a may be in the current location of lower wobble tooth 30b. During one nutation, the wobble plate 14 may advance in the first nutation direction 72 by approximately 1.99 degrees, that is, 360 degrees divided by 181 teeth.

During that same nutation, the upper wobble teeth 32 may advance in direction 72 by the same angular amount as the lower wobble teeth 30, namely approximately 1.99 degrees, because the wobble plate 14 and the associated upper and lower wobble teeth 32 and 30 form a rigid object. However, the angular separation between adjacent upper wobble teeth 32, for example upper wobble teeth 32a and 32b, may be approximately 1.98 degrees, that is, 360 degrees divided by 182 teeth. Thus, after one nutation, upper wobble tooth 32a may be 0.01 degrees farther to the right than the current location of upper wobble tooth 32b. That is, upper wobble tooth 32b may be currently 1.98 degrees away from upper wobble tooth 32a but, after one nutation, upper wobble tooth 32a may have advanced in direction 72 by 1.99 degrees.

Upper wobble tooth 32b is depicted making contact with output tooth 38b during the nutation shown in FIG. 20. In the case where there are 182 upper wobble teeth and 181 output teeth, during the next nutation upper wobble tooth 32a may make contact with output tooth 38b. That is, the output gear 16 may be moving in direction 84 with respect to wobble plate 14.

During the nutation shown in FIG. 20, output tooth 38b is making contact with upper wobble tooth 32b. During the next nutation, output tooth 38b may be making contact with upper wobble tooth 32a, which may be 0.01 degrees farther to the right than the current location of upper wobble tooth 32b. That is, during one full nutation of wobble plate 14, output tooth 38b, and hence output plate 16 itself, may have advanced 0.01 degrees along direction 72.

A gear ratio may be calculated by dividing 360 degrees by the angular displacement of the output gear 16 during one full nutation. For the exemplary embodiment shown in FIG. 20, this gear ratio can be shown to be the product of the numbers of upper and lower wobble teeth 32 and 30. When counts of the numbers of upper and lower wobble teeth are 182 and 181 respectively, the gear ratio would be approximately 33,000. In other words, it may take approximately 33,000 nutations of wobble plate 14 to generate one complete rotation of output gear 16.

Figure 21:
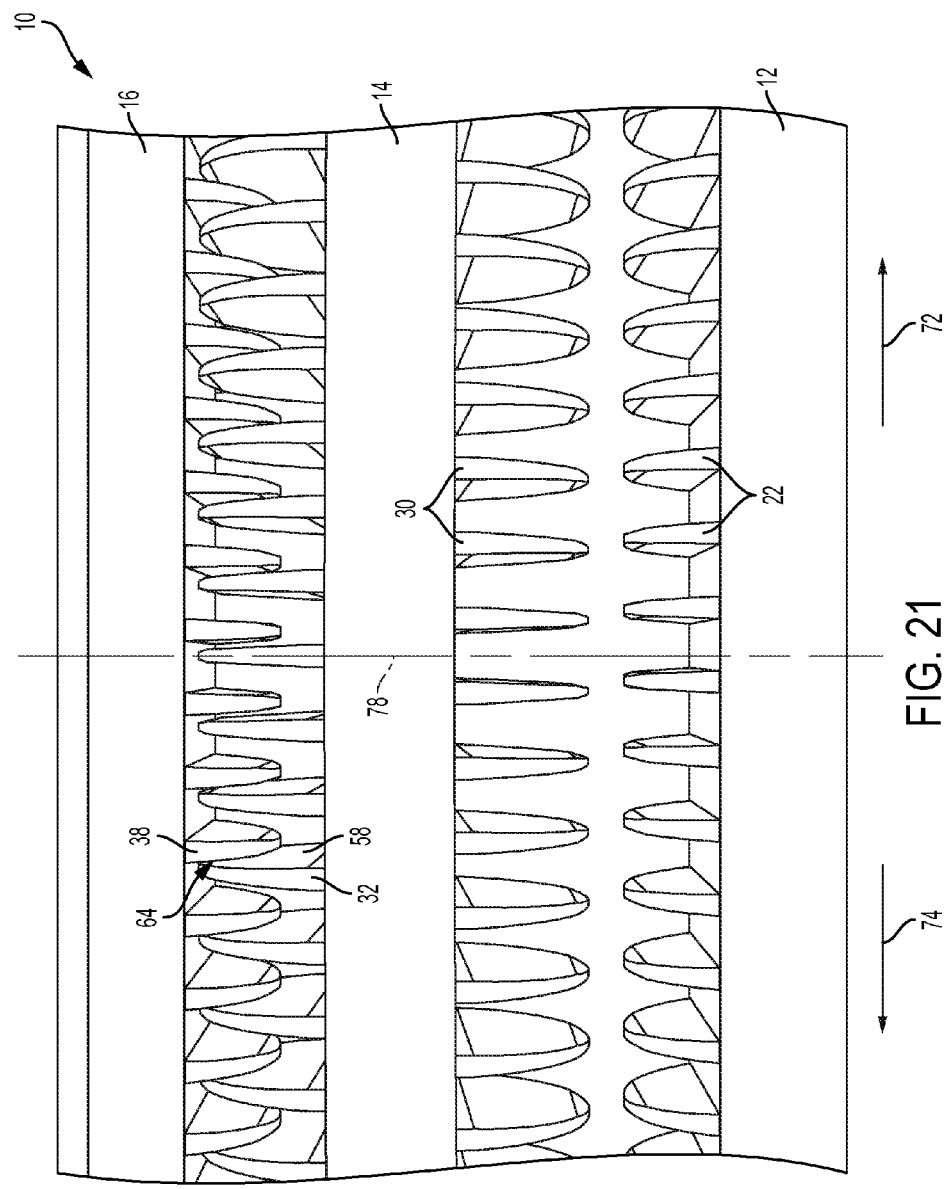
FIG. 21 is a diagrammatic representation of a zoomed in view of FIG. 17, showing the 180-degree position.

FIG. 21 is a zoomed in view of FIG. 17, showing the 180-degree position 78 of the wobble plate 14. As described in reference to FIG. 17, a subset of upper wobble teeth 32 may make contact, or engage with, a subset of output teeth 38 between the 90-degree position 76 (see FIG. 20) and the 180-degree position 78. As wobble plate 14 nutates, the contact between the output teeth 38 and the upper wobble teeth 32 may be a sliding contact. The contact between an upper wobble tooth 32 and an output tooth 38 may be between the third driving face 58 of the upper wobble tooth 32 and the third driven face 64 of the output tooth 38.

During a nutation of wobble plate 14 the first contact between an upper wobble tooth 32 and an output tooth 38 may occur when the upper wobble tooth 32 is proximate the 180-degree position 78. This contact may cease when the upper wobble tooth 32 is proximate the 90-degree position 76 (see FIG. 20). The first contact between an upper wobble tooth 32 and an output tooth 38 may be at any location between the 180-degree position 78 and the 90-degree position 76. The last contact between the upper wobble tooth 32 may be anywhere between the first contact location and the 90-degree position 76.

FIG. 22 is a zoomed in view of FIG. 18, showing the 270-degree position 80 of wobble plate 14. At the 270-degree position 80 there may be substantially no contact between the upper wobble teeth 32 and the output teeth 38, nor between the lower wobble teeth 30 and the stator teeth 22 as the wobble plate 14 nutates in the first nutation direction 72. There may be substantially no contact between any of the teeth at any location between the 180-degree position 78 (see FIG. 21) and the down position 70 (see FIG. 19) along direction 72.

FIGS. 16-22 are discussed above in reference to wobble plate 14 nutating in a first nutation direction 72. The wobble plate 14 may also nutate in a second nutation direction 74, as depicted and discussed in reference to FIG. 15. When the wobble plate 14 nutates in the second direction 74, the down position 70 may move to the left as shown in FIG. 15, that is, in direction 74. The 90-degree position 76 may be one fourth of the way around the wobble plate 14 in direction 74. The 180-degree position 78 may be on the opposite side of wobble plate 14 from the down position 70. The 270-degree position 80 may be three fourths of the way around the wobble plate 14 in direction 74.

As the wobble plate 14 nutates in the second nutation direction 74, the second driving faces 42 of the stator teeth 22 (see FIG. 4) may engage with the second driven faces 54 of the lower wobble teeth 30 (see FIGS. 7 and 8). As the wobble plate 14 nutates in the second nutation direction 74, the fourth driving faces 60 of the upper wobble teeth 32 (see FIG. 8) may engage with the fourth driven faces 66 of the output teeth 38 (see FIG. 12). These engagements of the teeth may cause the output gear 16 to rotate in direction 74 with respect to the stationary stator 12, similar to the manner of nutation in the first nutation direction 72 discussed in reference to FIG. 20.

Figure 23:
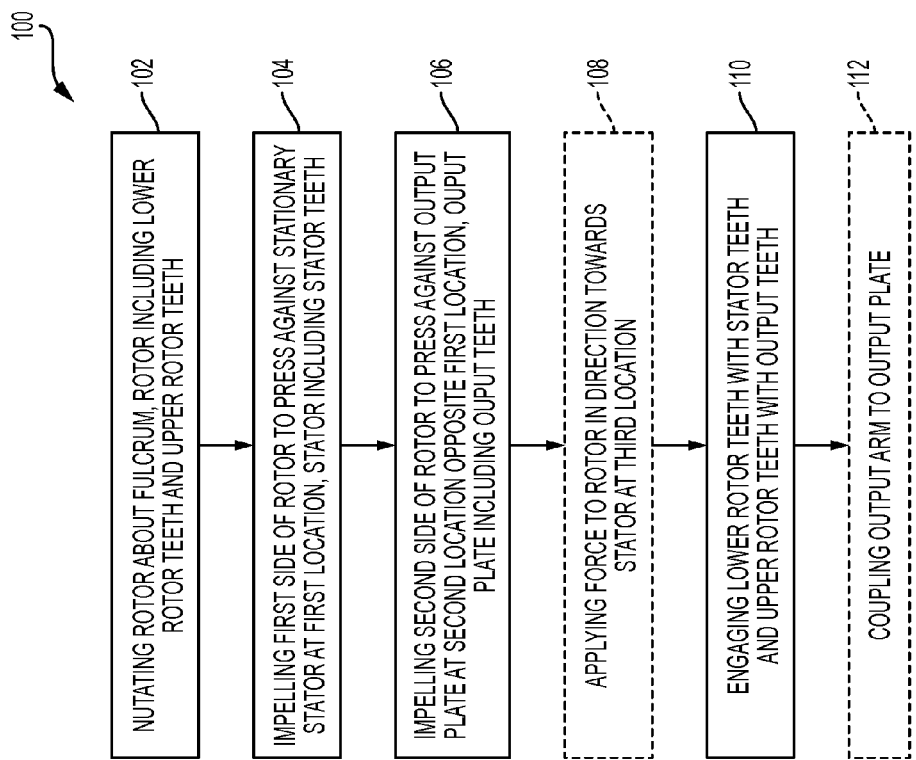
FIG. 23 is a diagrammatic representation of a flow chart illustrating a method for operating a wobble plate drive mechanism.

FIG. 23 depicts multiple steps of a method, generally indicated at 100, for operating a wobble plate drive mechanism according to aspects of the present disclosure. The wobble plate drive mechanism may be any of the embodiments depicted and discussed in reference to FIGS. 1-22. Although various steps of method 100 are described below and depicted in FIG. 23, the steps need not necessarily all be performed, in some cases may be performed in a different order than the order shown, and in some cases may be performed concurrently.

Method 100 may include a step 102 of nutating a rotor about a fulcrum, the rotor including a plurality of lower rotor teeth and a plurality of upper rotor teeth. As discussed in reference to FIG. 7, the wobble plate or rotor 14 may be supported by a fulcrum. The rotor 14 may have a wobble axis 24 that may precess or nutate around a stationary central axis 18. The nutating wobble axis 24 and stationary central axis 18 may be seen and discussed in reference to FIG. 2.

The rotor may have a plurality of lower rotor teeth and a plurality of upper rotor teeth, see for example, the lower wobble teeth 30 and the upper wobble teeth 32 respectively discussed in FIGS. 2-22. Each of the pluralities of upper rotor teeth and lower rotor teeth may have a face defined by a compound involute of a circle and an ellipse, as discussed in relation to FIGS. 6A, 6B, 10A, and 10B. Each of the plurality of upper rotor teeth may have a rectangular footprint on an upper rotor surface of the rotor, as discussed in relation to FIG. 9. Each of the plurality of lower rotor teeth may have a rectangular footprint on a lower rotor surface of the rotor, as discussed in relation to FIG. 9.

Method 100 may include a step 104 of impelling a first side of the rotor to press against a stationary stator at a first location, the stator including a plurality of stator teeth. For example, the first location may be the down position 70 depicted in FIGS. 15 and 19 where rotor 14 is pressing against stationary stator 12. The first side of the rotor 14 may be the lower wobble surface 26 shown in FIG. 2. At the first location a lower rotor tooth surface 56 of a lower rotor tooth 30 may be in contact with an upper surface 20 of stator 12. See FIG. 8 for a view of the lower rotor tooth surface 56 and FIG. 2 for a view of the upper surface 20 of stator 12.

The stator may include a plurality of stator teeth, see for example the plurality of stator teeth 22 depicted in FIG. 2. As discussed in relation to FIGS. 6A and 6B, each tooth of the plurality of stator teeth 22 may have a face defined by a compound involute of a circle and an ellipse. As discussed in relation to FIG. 5, each tooth of the plurality of stator teeth 22 may have a rectangular footprint on an upper surface 20 of the stator.

As further discussed in relation to FIG. 5, a pair of adjacent stator teeth 22 may define a tooth pitch A2 as an angular separation between corresponding locations on each tooth of the pair of adjacent stator teeth 22. Each tooth footprint of the pair of adjacent stator teeth 22 may have an angular width A3 that is less than one half of the tooth pitch A2.

As discussed in reference to FIG. 4, each tooth of the plurality of stator teeth 22 may be disposed between an inner diameter D1 and an outer diameter D2 and may have a tooth height H1. The tooth height H1 may have a maximum value between the inner diameter D1 and the outer diameter D2 and a minimum value at one of the inner diameter D1 or the outer diameter D2.

The stator may include a set of electromagnets. Each of the set of electromagnets may be capable of creating a variable magnetic field. The strength and direction of the magnetic fields may both be variable. Each of the set of electromagnets may be independently controllable. Each of the set of electromagnets may create a magnetic field when a current passes through the electromagnet. The current may be an alternating current or a direct current.

The rotor may include a magnetic material capable of responding to the magnetic fields created by the set of electromagnets in the stationary stator. The first side of the rotor may be impelled to press against the stator by magnetic forces applied to the rotor, the magnetic forces being a response of the rotor to the magnetic fields created by the electromagnets of the stator.

Method 100 may include a step 106 of impelling a second side of the rotor to press against an output plate at a second location, the second location being on the opposite side of the rotor as the first location, the output plate including a plurality of output teeth. The second side of the rotor may the upper wobble surface 28 seen in FIG. 2. The second location may be the 180-degree position 78 depicted in FIGS. 17 and 21, which may be on the opposite side of the rotor as the down position 70 shown in FIGS. 15 and 19.

The output plate may be output gear 16 and the plurality of output teeth may be the plurality of output teeth 38 shown in FIG. 2. As discussed in relation to FIGS. 14A and 14B, each tooth in the plurality of output teeth 38 may have a face defined by a compound involute of a circle and an ellipse. As discussed in relation to FIG. 13, each tooth of the plurality of output teeth 38 may have a rectangular footprint on a lower surface of the output plate.

The second side of the rotor may be impelled to press against the output plate by magnetic forces applied to the rotor. The second location on the rotor may be impelled against the output plate directly or indirectly by magnetic forces. For a direct example, a force may be applied to the rotor at the second location, the force directed towards the output plate. In an indirect example, the rotor may be supported by a fulcrum proximate the wobble axis. If a magnetic force is applied to the rotor at the first location in a direction away from the output plate, then the second location on the opposite side of the rotor may be leveraged towards the output plate, much like a seesaw. Thus, the second location on the rotor may be impelled towards the output plate by the combined effects of forces applied to the rotor at the first location and the support of the fulcrum.

The stator of step 104 may define a stator plane. The output plate of step 106 may be configured to be parallel to the stator plane and the rotor of step 102 may be configured to be inclined at an angle with respect to the stator plane and the output plate and disposed between the stator and the output plate, see for example FIG. 2.

Method 100 may include a step 110 of engaging the lower rotor teeth with the stator teeth and the upper rotor teeth with the output teeth. Step 110 may be performed concurrently with step 102, that is, the engagement of the pluralities of teeth may occur as the rotor nutates about the fulcrum. As the rotor nutates, any individual lower rotor tooth may have periods of engagement with a first stator tooth, periods where the lower rotor tooth is not engaged with any teeth, and periods of engagement with a second stator tooth adjacent to the first stator tooth, see the discussion relating to FIG. 20.

As the rotor nutates, any individual upper rotor tooth may have periods of engagement with a first output tooth, periods where the upper rotor tooth is not engaged with any teeth, and periods of engagement with a second output tooth adjacent to the first output tooth. The engagement between teeth may be a sliding contact between faces that may be defined by a compound involute of a circle and an ellipse.

The counts of the number of teeth in the pluralities of stator teeth, lower rotor teeth, upper rotor teeth, and output teeth may be configured to provide a number of nutations for every single rotation of the output plate. For example, in the exemplary embodiment shown in FIGS. 1-22, there are 180 stator teeth, 181 lower rotor teeth, 182 upper rotor teeth, and 181 output teeth. As discussed in relation to FIG. 20 this configuration leads to a gear ratio where the rotor will nutate approximately 33,000 times for every one time the output plate rotates. That is, the output plate may be configured to rotate with the nutating of the rotor. However, other choices for the counts of the pluralities of teeth can be made depending on the desired gear ratio and other design constraints.

Method 100 may optionally include a step 108 of applying a force to the rotor in a direction towards the stator at a third location. The third location may be the 90-degree position 76 shown in FIGS. 16 and 20. That is, the third location may be 90 degrees removed from the first location around the rotor in a direction of nutation, where the first location may be the down position 70 and the direction of nutation may be either of the first nutation direction 72 or the second nutation direction 74 (see FIGS. 15 and 19).

If the rotor makes contact with the stator at the first location and a force is applied at the third location 90 degrees around the rotor from the first location, this force may cause the rotor to nutate in a direction towards the third location. That is, if an attractive force is applied to the 90-degree position 76 shown in FIG. 20 and the rotor 14 at that position moves towards the stator 12 in response to that force, then one quarter of a nutation later that same location on the rotor 14 will now be at the down position 70 (see FIG. 19).

Applying a force to the rotor that is always 90 degrees ahead of the down position in the direction of nutation may drive the nutation of the rotor about the fulcrum. As described in reference to step 104, magnetic forces may be applied to the rotor by the magnetic fields created by a set of electromagnets of the stator. As the strength and direction of the magnetic fields created by the set of electromagnets may be controlled, the forces applied to the rotor may change their direction and their location on the rotor. Electromagnetic forces may be used to impel the engagement of the rotor teeth with the stator and the output plate as well as drive the nutation of the rotor itself.

Method 100 may optionally include a step 112 of coupling an output arm to the output plate. There are numerous ways to couple a rotating plate or gear to an arm or shaft so that the angular rotation of the plate corresponds to a linear movement of the arm. As the wobble plate drive mechanism used in method 100 may be configured so that a large number of nutations of the rotor results in only one rotation of the output plate, see the discussion of step 110, such a mechanism may be used to create an actuator capable of very fine control of an output plate or an output arm.

The steps of method 100 need not be completed in the order listed above or shown in FIG. 23. Indeed, some or all of the steps of method 100 may be performed at the same time. Some or all of the steps of method 100 may be performed for some or all of the duration of use of the wobble plate drive mechanism.

Advantages, Features, Benefits

The embodiments of the wobble plate drive system described herein provide several advantages over known solutions for designing motors with high gear ratios that also take up a small volume. According to the present disclosure gear ratios in the tens of thousands are possible using only a stator, a wobble plate, and an output plate where such mechanisms could be contained within a small volume. For example, the illustrative embodiments described herein allow for non-eccentric motion of a nutating wobble plate. No known system or device can perform these functions, particularly in such a small volume. Thus, the illustrative embodiments described herein are particularly useful for creating actuators with very fine motor control. However, not all embodiments described herein provide the same advantages or the same degree of advantage.

CONCLUSION

The disclosure set forth above may encompass multiple distinct disclosures with independent utility. Although each of these disclosures has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed disclosure. The subject matter of the disclosure(s) includes all novel and nonobvious combinations and subcombinations of the various elements, features, functions, and/or properties disclosed herein. The following claims particularly point out certain combinations and subcombinations regarded as novel and nonobvious. Disclosure(s) embodied in other combinations and subcombinations of features, functions, elements, and/or properties may be claimed in applications claiming priority from this or a related application. Such claims, whether directed to a different disclosure or to the same disclosure, and whether broader, narrower, equal, or different in scope to the original claims, also are regarded as included within the subject matter of the disclosure(s) of the present disclosure.

We claim:

1. A wobble plate drive system, comprising:
a stator having a central axis, an upper surface perpendicular to the central axis, and a plurality of stator teeth disposed on the upper surface;
a wobble plate having a wobble axis disposed at a non-zero angle relative to the central axis, a lower wobble surface perpendicular to the wobble axis, an upper wobble surface perpendicular to the wobble axis, a plurality of lower wobble teeth disposed on the lower wobble surface, and a plurality of upper wobble teeth disposed on the upper wobble surface; and
an output gear having an output axis substantially aligned with the central axis, a lower surface perpendicular to the output axis, and a plurality of output teeth disposed on the lower surface;
wherein the wobble plate is configured to rotate as it nutates around the stator.

2. The wobble plate drive system of claim 1, wherein the wobble plate has a down position where the wobble plate is closest to the stator, further wherein the plurality of lower wobble teeth and the plurality of stator teeth are configured such that the plurality of lower wobble teeth first engage the stator teeth at a position 90 degrees away in a direction of nutation from the down position.

3. The wobble plate drive system of claim 1, wherein each tooth of the plurality of stator teeth, the plurality of lower wobble teeth, the plurality of upper wobble teeth, and the plurality of output teeth have a face defined by a compound involute of a circle and an ellipse.

4. The wobble plate drive system of claim 1, wherein the stator includes an inner diameter, an outer diameter, and a pitch circle, the plurality of stator teeth disposed between the inner and outer diameters, and the pitch circle disposed between the inner and outer diameters, further wherein the plurality of stator teeth and the plurality of lower wobble teeth are configured such that a set of contact forces exerted by the pluralities of stator teeth and lower wobble teeth on each other are substantially tangent to the pitch circle.

5. The wobble plate drive system of claim 4, wherein each tooth of the plurality of stator teeth has a tooth height and the tooth height has a maximum value between the inner diameter and the outer diameter and a minimum value at one of the inner diameter or the outer diameter.

6. The wobble plate drive system of claim 1, wherein each tooth of the plurality of stator teeth has a rectangular footprint on the upper surface, each tooth of the plurality of lower wobble teeth has a rectangular footprint on the lower wobble surface, each tooth of the plurality of upper wobble teeth has a rectangular footprint on the upper wobble surface, and each tooth of the plurality of output teeth has a rectangular footprint on the lower surface.

7. The wobble plate drive system of claim 1, wherein
a pair of adjacent stator teeth define a tooth pitch as an angular separation between corresponding locations on each tooth of the pair of adjacent stator teeth;
each tooth of the pair of adjacent stator teeth defines a tooth footprint on the upper surface; and
each tooth footprint of the pair of adjacent stator teeth has an angular width that is less than one half of the tooth pitch.

8. A method for operating a wobble plate drive mechanism, comprising:
nutating a rotor about a fulcrum, the rotor including a plurality of lower rotor teeth and a plurality of upper rotor teeth,
impelling a first side of the rotor to press against a stationary stator at a first location, the stator including a plurality of stator teeth,
impelling a second side of the rotor to press against an output plate at a second location, the second location being on an opposite side of the rotor as the first location, the output plate including a plurality of output teeth, and
engaging the lower rotor teeth with the stator teeth and the upper rotor teeth with the output teeth as the rotor nutates about the fulcrum.

9. The method of claim 8, wherein each tooth of the pluralities of stator teeth, lower rotor teeth, upper rotor teeth, and output teeth has a face defined by a compound involute of a circle and an ellipse.

10. The method of claim 8, wherein each tooth of the plurality of stator teeth has a rectangular footprint on an upper surface of the stator, each tooth of the plurality of lower rotor teeth has a rectangular footprint on a lower surface of the rotor, each tooth of the plurality of upper rotor teeth has a rectangular footprint on an upper surface of the rotor, and each tooth of the plurality of output teeth has a rectangular footprint on a lower surface of the output plate.

11. The method of claim 10, wherein
a pair of adjacent stator teeth define a tooth pitch as an angular separation between corresponding locations on each tooth of the pair of adjacent stator teeth; and
each tooth footprint of the pair of adjacent stator teeth has an angular width that is less than one half of the tooth pitch.

12. The method of claim 8, wherein the stator defines a stator plane, the output plate is configured to be parallel to the stator plane, and the rotor is configured to be inclined at an angle with respect to the stator plane and the output plate and disposed between the stator and the output plate.

13. The method of claim 8, further comprising applying a force to the rotor in a direction towards the stator at a third location that is 90 degrees removed from the first location around the rotor in a direction of nutation.

14. The method of claim 8, wherein each tooth of the plurality of stator teeth is disposed between an inner diameter and an outer diameter and has a tooth height, the tooth height having a maximum value between the inner diameter and the outer diameter and a minimum value at one of the inner diameter or the outer diameter.

15. A gear for use in a nutating wobble plate drive system, the gear comprising:
a central axis, a surface perpendicular to the central axis, an inner diameter, and an outer diameter;
a set of teeth disposed on the surface between the inner diameter and the outer diameter, and
at least one of the set of teeth having a first driving face extending from the inner diameter to the outer diameter, the first driving face defined by a compound involute of a circle and an ellipse,
the at least one of the set of teeth being disposed on the surface between the inner diameter and the outer diameter.

16. The gear of claim 15, wherein at least one of the set of teeth has a rectangular footprint on the surface.

17. The gear of claim 15, wherein:
a pair of adjacent teeth define a tooth pitch as an angular separation between corresponding locations on each tooth of the pair of adjacent teeth;
each tooth of the pair of adjacent teeth defines a tooth footprint on the surface; and
each tooth footprint of each tooth of the pair of adjacent teeth has an angular width that is less than one half of the tooth pitch.

18. The gear of claim 15, wherein at least one of the teeth has a second driving face defined by a compound involute of a circle and an ellipse, the second driving face disposed opposite to the first driving face.

19. The gear of claim 18, wherein at least one of the teeth has an upper tooth surface having a tooth height, the upper tooth surface extending from the first driving face to the second driving face; and wherein the tooth height has a maximum value between the inner diameter and the outer diameter and a minimum value at one of the inner diameter or the outer diameter.

20. The gear of claim 15, wherein the set of teeth are configured such that contact forces exerted on the teeth by another gear in the nutating wobble plate drive system will be in a direction substantially parallel to a tangent of a pitch circle disposed between the inner diameter and the outer diameter.

* * * * *